US012604367B2

(12) United States Patent　　　　(10) Patent No.: US 12,604,367 B2
Li et al.　　　　　　　　　　　　　(45) Date of Patent: Apr. 14, 2026

(54) METHODS, DEVICES, AND SYSTEMS FOR CONFIGURING ENHANCED NON-PUBLIC NETWORK

(71) Applicant: ZTE Corporation, Shenzhen (CN)

(72) Inventors: Wenting Li, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 300 days.

(21) Appl. No.: 18/222,020

(22) Filed: Jul. 14, 2023

(65) Prior Publication Data

US 2023/0363055 A1　　Nov. 9, 2023

Related U.S. Application Data

(63) Continuation of application No. PCT/CN2021/071730, filed on Jan. 14, 2021.

(51) Int. Cl.
　　*H04W 76/40*　　(2018.01)
　　*H04W 48/16*　　(2009.01)
　　*H04W 84/04*　　(2009.01)
(52) U.S. Cl.
　　CPC ........... *H04W 76/40* (2018.02); *H04W 48/16* (2013.01); *H04W 84/042* (2013.01)
(58) Field of Classification Search
　　CPC ... H04W 76/40; H04W 48/16; H04W 84/042; H04W 8/186; H04W 48/12; H04W 48/18
　　See application file for complete search history.

(56) References Cited

U.S. PATENT DOCUMENTS

2020/0245235 A1　7/2020　Chun
2020/0322877 A1*　10/2020　Li ........................... H04W 48/12
2020/0329524 A1　10/2020　Park et al.

OTHER PUBLICATIONS

International Search Report and Written Opinion regarding PCT/CN2021/071730 dated Oct. 14, 2021, 8 pages.
3rd Generation Partnership Project, "Technical Specification Group Services and System Aspects; Study on enhanced support of non-public networks (Release 17)," *3GPP TR 23.700-07* V1 2.0, Nov. 30, 2020.
China Mobile, "S2-2007164r02, KI#3, New Solution: SNPN selection based on SNPN 86-96, service capability," *SA WG2 Meeting #141£(e-meeting)*, Oct. 24, 2020.

(Continued)

*Primary Examiner* — Diane D Mizrahi
(74) *Attorney, Agent, or Firm* — Crowell & Moring LLP

(57) ABSTRACT

The present disclosure describes methods, systems, and devices for configuring an enhanced non-public network (eNPN) for a new generation radio access network (NG-RAN). One method includes supporting, by a user equipment (UE), a network access feature by receiving, by the UE, a broadcast message from a RAN, wherein the broadcast message comprises at least one of the following: a group identifier (ID), a first indication, or a second indication. Another method includes supporting, by a UE, an eNPN by receiving, by the UE, an indication in a RRC signaling from a RAN, wherein the indication indicates whether to support at least one of the following for an non-public network: an internet protocol (IP) multimedia subsystem (IMS) voice, or an emergency call (eCall).

20 Claims, 10 Drawing Sheets

(56) References Cited

OTHER PUBLICATIONS

China Telecom, "RP-202363, Revised WID: Enhancement of Private Network Support 1-103 for NG-RAN," *3GPP TSG-RAN Meeting* #90-e, Dec. 11, 2020.

Ericsson, "R2-2010015, Selecting index for PLMN, SNPN and UAC parameters," *3GPP TSG RAN WG2* #112e, Nov. 13, 2020.

China Mobile, "S2-2008549, KI#3, New Solution: SNPN selection based on SNPN service capability," *SA WG 2 Meeting* #141£ (e-meeting), Oct. 24, 2020.

Extended European search report regarding EP 21 91 8352 dated Apr. 30, 2024, 12 pages.

Qualcomm Incorporated et al., Addressing open issues for Solution 2, 3GPP Draft, S2-2004348, 3rd Generation Partnership Project (3GPP), Mobile Competence Centre, 650, Route Des Lucioles, F-06921 Sophia-Antipolis Cedex, France, vol. SA WG2, No. Elbonia; Jun. 1, 2020-Jun. 12, 2020, Jun. 8, 2020, XP051894432, Retrieved from the Internet: https://ftp.3gpp.org/tsg_sa/WG2_Arch/TSGS2_193e_Electronics/Docs/S2-2004348.zip S2-2004348.doc.

Office Action issued in Canadian Application No. 3,193,714 dated Dec. 12, 2024, 7 pages.

Communication pursuant to Article 94(3) EPC issued in EP Application No. 21 918 352.2, dated Feb. 7, 2025, 7 pages.

Communication pursuant to Article 94(3) EPC issued in EP Application No. 21 918 352.2-1206 dated Aug. 14, 2025, (5 pages).

Office Action issued in Canadian Application No. 3,193,714 dated Sep. 17, 2025, (5 pages).

Office Action issued in Mexican Application No. MX/a/2023/004061 dated Jan. 15, 2026, with English translation (12 pages).

* cited by examiner

400 receiving, by the UE, a broadcast message from a radio access network (RAN), wherein the broadcast message comprises at least one of the following a group identifier (ID), a first indication, or a second indication

500 broadcasting, by the RAN, a broadcast message to a user equipment (UE), wherein the broadcast message comprises at least one of the following: a group identifier (ID), a first indication, or a second indication.

1200 receiving, by the UE, an indication in a RRC signalling from a radio access network (RAN), wherein the indication indicates whether to support at least one of the following for an non-public network: an internet protocol (IP) multimedia subsystem (IMS) voice, or an emergency call (eCall).

1300 sending, by the RAN, an indication in a RRC signalling to a user equipment (UE), wherein the indication indicates whether to support at least one of the following for an non-public network: an internet protocol (IP) multimedia subsystem (IMS) voice, or an emergency call (eCall).

METHODS, DEVICES, AND SYSTEMS FOR CONFIGURING ENHANCED NON-PUBLIC NETWORK

CROSS-REFERENCE TO RELATED APPLICATION

This application is a continuation application of PCT International Patent Application No. PCT/CN2021/071730, filed with the China National Intellectual Property Administration, PRC on Jan. 14, 2021, which is herein incorporated by reference in its entirety.

TECHNICAL FIELD

The present disclosure is directed generally to wireless communications. Particularly, the present disclosure relates to methods, devices, and systems for configuring an enhanced non-public network (eNPN) for a new generation radio access network (NG-RAN).

BACKGROUND

Wireless communication technologies are moving the world toward an increasingly connected and networked society. High-speed and low-latency wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. In order to fulfil the low latency and high reliability requirements for the vertical industry as well as support the new generation network service, a dedicated wireless network, i.e., private network, attracts attention.

The private network is also known as non-public network (NPN). A NPN is a network deployed for non-public use. In one implementation, an NPN may be employed as a Standalone Non-Public Network (SNPN), i.e., operated by an NPN operator and not relying on network functions provided by a public land mobile network (PLMN). In another implementation, an NPN may be employed as a public network integrated NPN (PNI-NPN), i.e., a non-public network deployed with the support of a PLMN. There are some problems/issues with implementing SNPN. For example but not limited to, how to enhance the support for SNPN along with subscription/credentials owned by an entity separate from the SNPN; how to support UE onboarding and provisioning for non-public networks; and/or how to support for voice or internet protocol (IP) multimedia subsystem (IMS) emergency services for SNPN.

The present disclosure describes various embodiments for configuring an enhanced non-public network (eNPN) for a new generation radio access network (NG-RAN), addressing at least one of the problems/issues discussed above.

SUMMARY

This document relates to methods, systems, and devices for wireless communication, and more specifically, for configuring an enhanced non-public network (eNPN) for a new generation radio access network (NG-RAN).

In one embodiment, the present disclosure describes a method for wireless communication. The method includes supporting, by a user equipment (UE), a network access feature by receiving, by the UE, a broadcast message from a radio access network (RAN), wherein the broadcast message comprises at least one of the following: a group identifier (ID), a first indication, or a second indication.

In another embodiment, the present disclosure describes a method for wireless communication. The method includes supporting, by a radio access network (RAN), a network access feature by broadcasting, by the RAN, a broadcast message to a user equipment (UE), wherein the broadcast message comprises at least one of the following: a group identifier (ID), a first indication, or a second indication.

In another embodiment, the present disclosure describes a method for wireless communication. The method includes supporting, by a user equipment (UE), an enhanced non-public network (eNPN) by receiving, by the UE, an indication in a RRC signaling from a radio access network (RAN), wherein the indication indicates whether to support at least one of the following for an non-public network: an internet protocol (IP) multimedia subsystem (IMS) voice, or an emergency call (eCall).

In another embodiment, the present disclosure describes a method for wireless communication. The method includes supporting, by a radio access network (RAN), an enhanced non-public network (eNPN) by sending, by the RAN, an indication in a RRC signaling to a user equipment (UE), wherein the indication indicates whether to support at least one of the following for an non-public network: an internet protocol (IP) multimedia subsystem (IMS) voice, or an emergency call (eCall).

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

FIG. 5 shows a flow diagram of a method for wireless communication.

FIG. 12 shows a flow diagram of a method for wireless communication.

FIG. 13 shows a flow diagram of a method for wireless communication.

DETAILED DESCRIPTION

Figure 1:
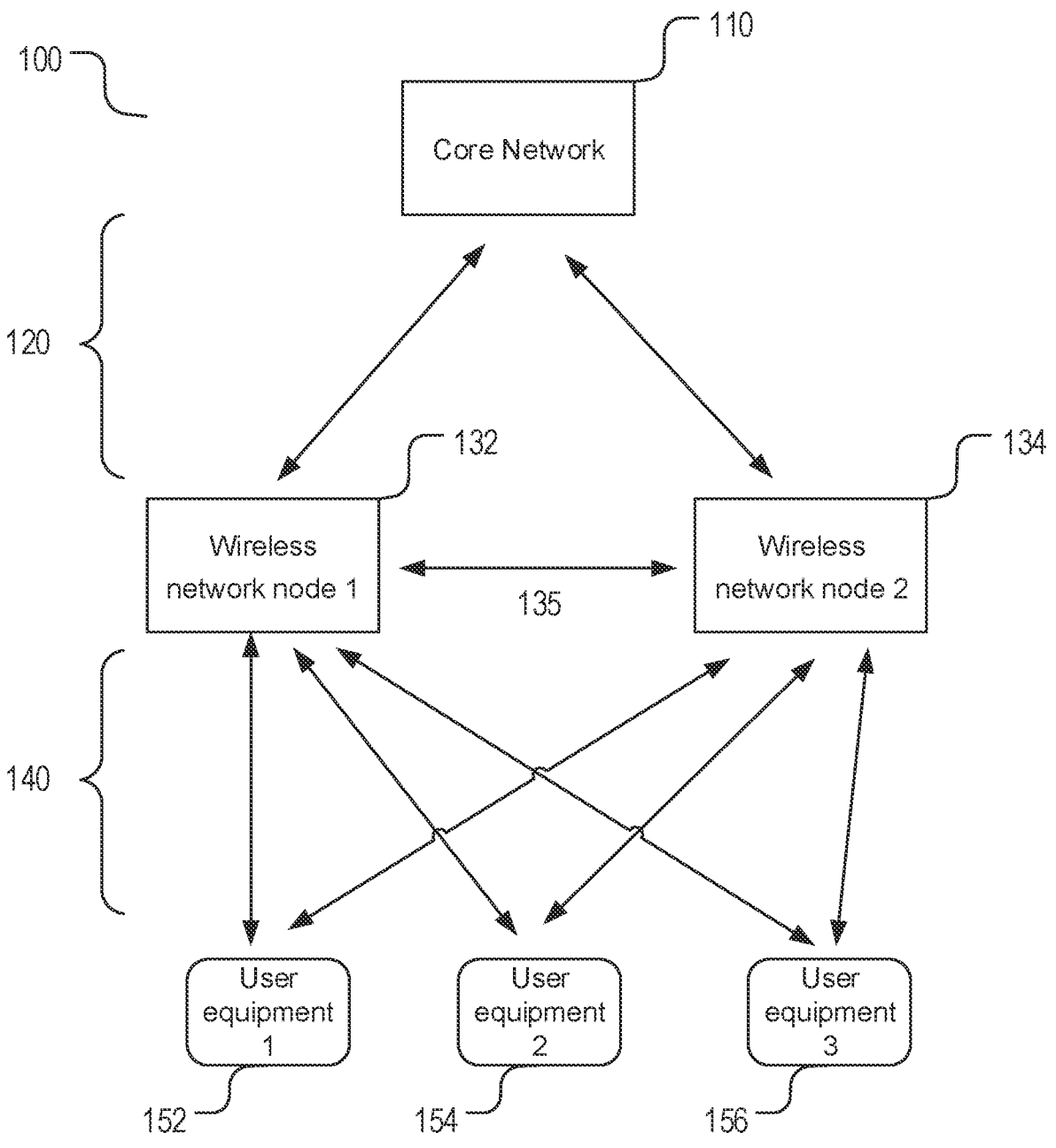
FIG. 1 shows an example of a wireless communication system include more than one network nodes and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for configuring an enhanced non-public network (eNPN) for a new generation radio access network (NG-RAN).

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfill the requirements from different industries and users.

A Non-Public Network (NPN) is a network deployed for non-public use. In one implementation, an NPN may be employed as a Stand-alone Non-Public Network (SNPN), i.e., operated by an NPN operator and not relying on network functions provided by a public land mobile network (PLMN). In another implementation, an NPN may be employed as a Public network integrated NPN, i.e., a non-public network deployed with the support of a PLMN.

There are some issues/problems associated with efficiently implementation of NPN. For example but not limited to: enhancements to enable support for SNPN along with subscription/credentials owned by an entity separate from the SNPN; how to support UE onboarding and provisioning for NPNs; and/or support for voice or internet protocol (IP) multimedia subsystem (IMS) emergency services for SNPN. The present disclosure provides the solutions to at least one of the issues/problems discussed above.

The present disclosure describes various embodiments for supporting enhanced non-public network (eNPN) for NG-RAN. In some circumstances, RAN functionality may include supporting SNPN along with subscription or credentials owned by an entity separate from the SNPN including at least one of the broadcasting of information to enable SNPN selection for UEs with subscription/credentials owned by an entity separate from the SNPN, the associated cell selection/reselection and connected mode mobility support, or the necessary modifications over network interfaces (e.g., NG, Xn, F1, E1 etc.). In some circumstances, RAN functionality may include supporting UE onboarding and provisioning for NPN including at least one of the UE onboarding relevant parameter broadcast from system information block (SIB), the associated cell selection/reselection, cell access control and the connected mode mobility support, or the necessary modifications over network interfaces (e.g., NG, Xn, F1, E1 etc.). In some circumstances, RAN functionality may include supporting IMS voice and emergency services for SNPN including at least broadcasting of relevant parameters.

The present disclosure describes various embodiment for providing solutions for at least one of the circumstances discussed above. FIG. 1 shows a wireless communication system 100 including one or more wireless network node (132 and 134) and one or more user equipment (UE) (152, 154, and 156). The wireless network node may be a radio access network (RAN) or a base station, which may be a nodeB (NB, e.g., an eNB or gNB) in a mobile telecommunications context. Each of the UE may wirelessly communicate with the wireless network nodes via a plurality of radio channels 140. For example, a first UE 152 may wirelessly communicate with a first wireless network node 132 via a channel including a plurality of radio channels during a certain period of time, and the first UE 152 may also wirelessly communicate with a second wireless network node 134 via a channel including a plurality of radio channels during a certain period of time. Likewise, a second UE 154 and a third UE 156 may wirelessly communicate with the first and second wireless network nodes. The first wireless network node 132 and the second wireless network node 134 may communicate to each other via one or more channel 135.

In one implementation, referring to FIG. 1, the wireless communication system 100 may include a core network (CN) 110. The CN 110 may communicate with one or more wireless network node via one or more channel 120.

Figure 2:
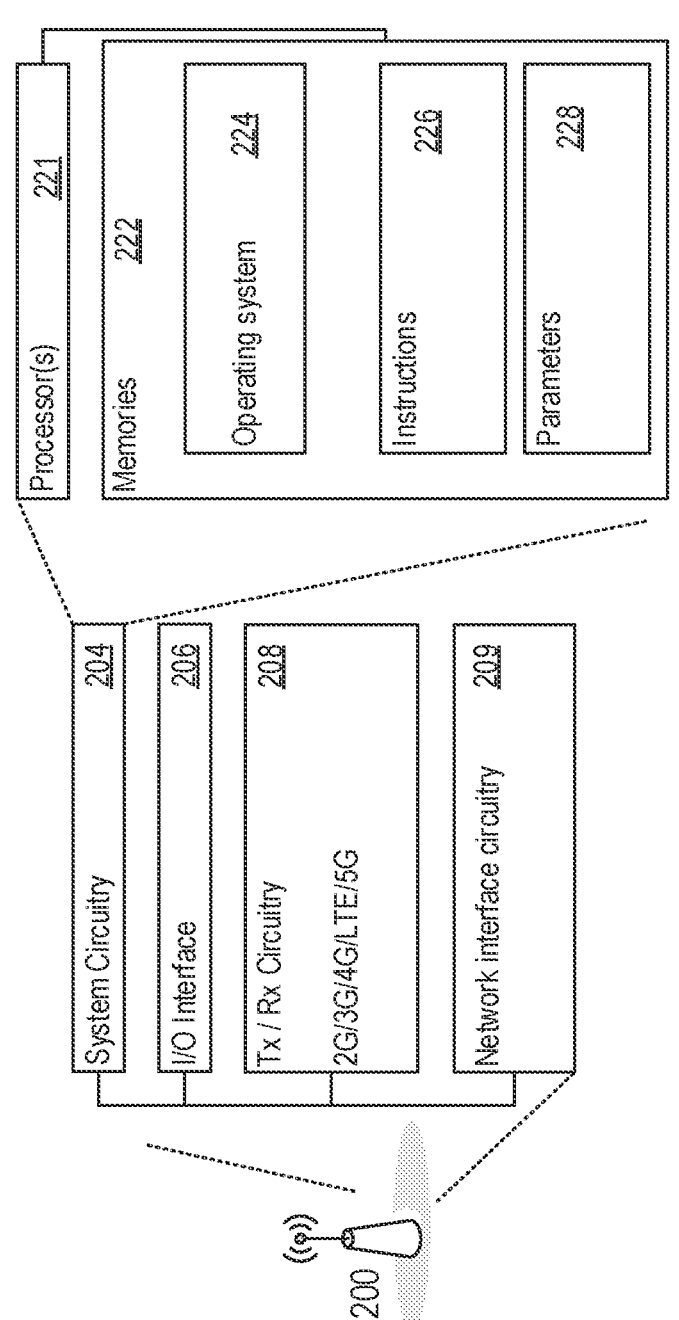
FIG. 2 shows an example of a network node.

FIG. 2 shows an example of electronic device 200 to implement a network node or network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 221 to perform the functions of the network node. The parameters 228 may include parameters to support execution of the instructions 226. For example, parameters may include network protocol settings, bandwidth parameters, radio frequency mapping assignments, and/or other parameters.

Figure 3:
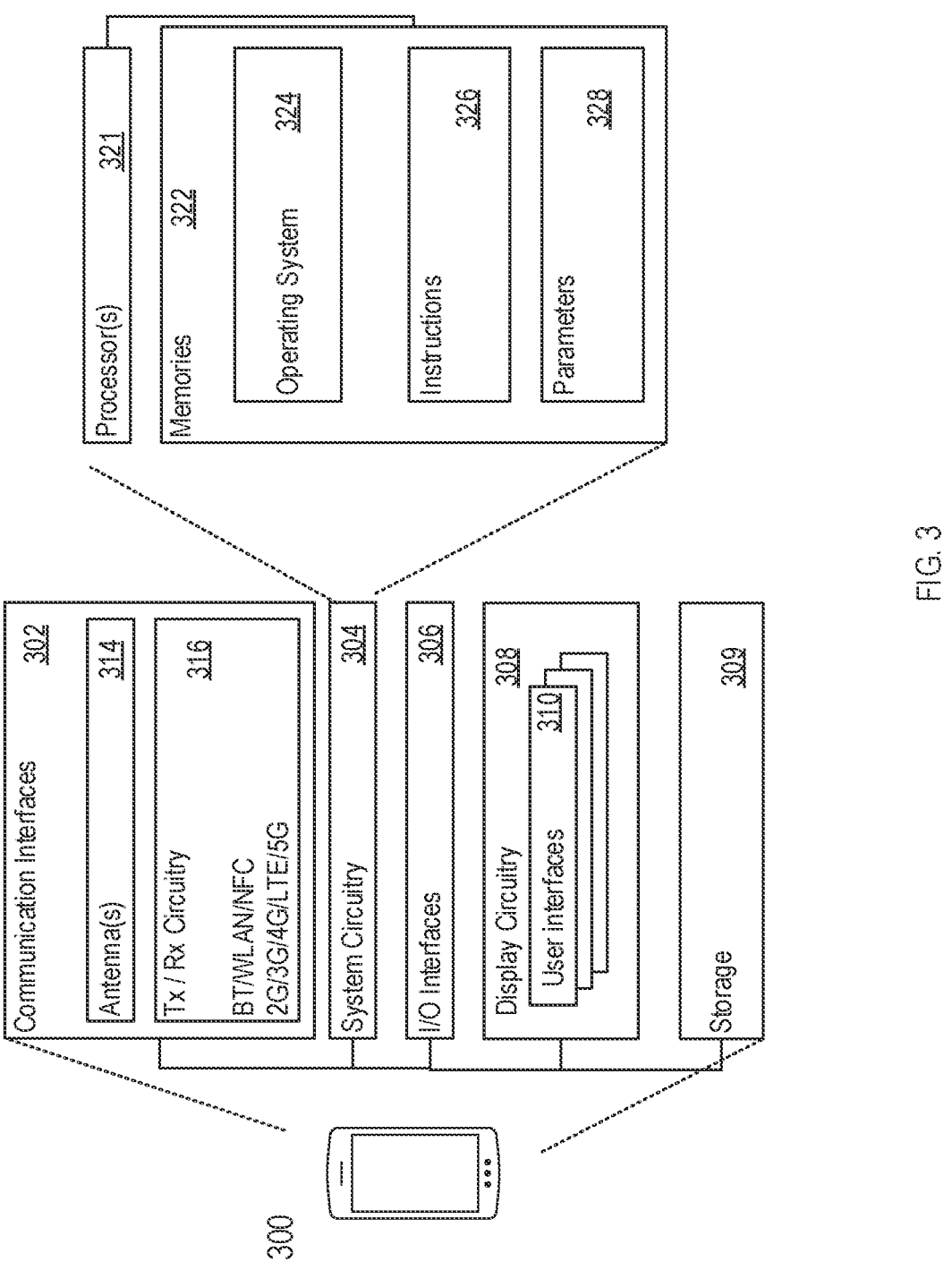
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network and/or the user equipment described above in FIGS. 2-3.

Figures 4, 5:
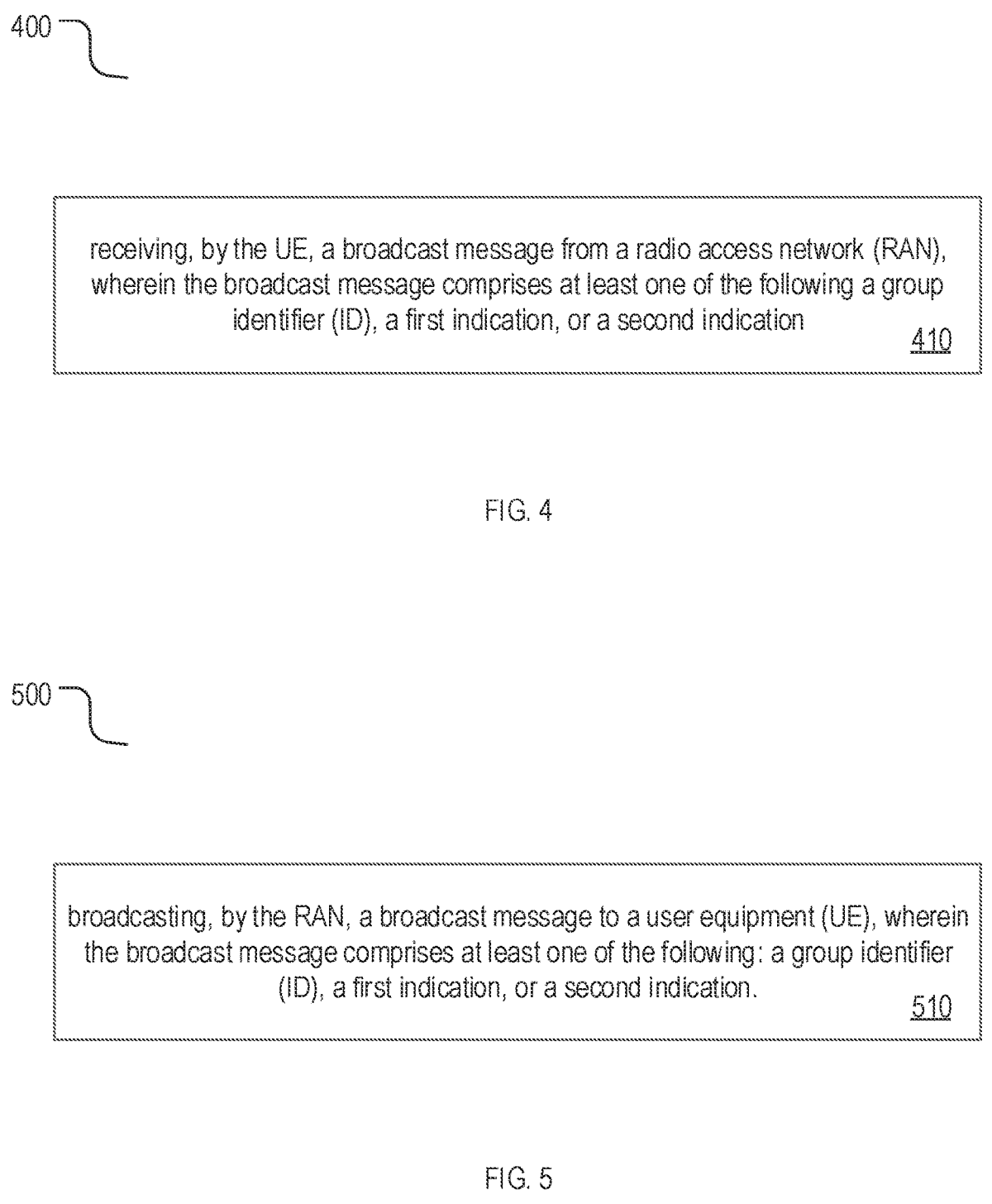

Referring to FIG. 4, the present disclosure describes various embodiments of a method 400 for supporting, by a user equipment (UE), a network access feature. The method 400 includes a portion or all of the following step: step 410: receiving, by the UE, a broadcast message from a radio access network (RAN), wherein the broadcast message comprises at least one of the following a group identifier (ID), a first indication, or a second indication.

In one implementation, the group ID comprises at least one network ID comprising at least one of the following: a stand-along non-public network (SNPN) ID, or a public land mobile network (PLMN) ID; the first indication indicates that a specific network-access is supported; and the second indication indicates whether a SNPN allows an access attempt corresponding to the specific network-access from a UE that is not explicitly configured to select the SNPN. In another implementation, the broadcast message comprising a system information block (SIB), for one example, SIB1.

In various embodiments, the group ID includes at least one of the following: a group of home separate entities, a group of on-boarding networks, and/or a group of subscription owners.

In various embodiments, the specific network-access comprises access using credentials from a separate entity, for example, a separate subscription entity for the SNPN, or home subscription provider (HSP). In some embodiments, the specific network-access comprises on-boarding access. In one implementation, the broadcast message comprises at least one of the following per network ID: the at least one Group ID, the first indication, or the second indication.

In another implementation, the UE receives at least one of the following for each network ID: the at least one group ID, the first indication, or the second indication in a legacy network ID field in the broadcast message.

In another implementation, the UE receives a new network ID list in the broadcast message.

In another implementation, the new network ID list comprises an index of each network ID corresponding to a legacy network ID list.

In another implementation, for each index, the UE receives at least one of the following: the at least one group ID, the first indication, or the second indication.

In another implementation, in response to the first indication for a network ID being configured or TRUE, the UE determines that the network ID supports the specific network-access.

In another implementation, in response to the first indication for a network ID being configured or TRUE, a lower layer of the UE reports the first indication to an upper layer of the UE.

In another implementation, in response to the second indication for a network ID being configured or TRUE, the UE determines that the network ID supports the access attempts corresponding to the specific network-access from a UE that is not explicitly configured to select the network ID.

In another implementation, in response to the second indication for a network ID being configured or TRUE, a lower layer of the UE reports the second indication to an upper layer of the UE.

In another implementation, the lower layer of the UE comprises a access stratum (AS) layer; and the upper layer of the UE comprises a non-access stratum (NAS) layer.

In another implementation, an upper layer of the UE indicates at least one group ID to a lower layer of the UE; and the lower layer of the UE performs a group ID selection.

In another implementation, in response to selecting a matched group ID, the lower layer reports cell access information corresponding to the matched group ID to the upper layer.

In another implementation, the cell access information corresponding to the matched group ID comprises at least one of the following: a SNPN ID, a cell ID, or a tracking area code (TAC).

In another implementation, the UE determines a unified access control (UAC) for the selected group ID based on the corresponding network ID.

In another implementation, the corresponding network ID comprises a SNPN ID.

In another implementation, the UE indicates a selected Group ID information to the RAN, so that the RAN selects an access and mobility management function (AMF) based on the selected group ID.

In another implementation, the selected group ID comprises an index according to a list of group IDs of the corresponding SNPN ID.

In another implementation, the UE indicates the selected Group ID by a radio resource control (RRC) signaling.

In another implementation, the RRC signaling comprises one of RRCSetupComplete or RRCResumeComplete.

In another implementation, the broadcast message comprises at least one of the following: the at least one group ID per cell, the first indication per network ID, or the second indication per network ID.

In another implementation, for each group ID, the broadcast message further comprises at least one of: a tracking area code (TAC), a cell ID, a Ran Area code (RAC) or a cell for other use indicator.

In another implementation, an upper layer of the UE indicates one or more group ID to a lower layer of the UE; and the lower layer of the UE performs a group ID selection.

In another implementation, in response to the UE receiving the broadcast message comprising a matched group ID to the one or more group ID indicated by the upper layer of the UE, the lower layer of the UE reports the matched group ID to the upper layer and stores cell access information.

In another implementation, the cell access information comprising at least one of the following: a network ID, a tracking area code (TAC), a cell ID, or a cell for other use indicator.

In another implementation, the UE receives unified access control (UAC) barring information for the at least one group ID from the broadcast message, and the UE determines at least one UAC parameter based on the selected group ID from the upper layer of the UE.

In another implementation, the UE receives the UAC barring information in a legacy UAC parameter field.

In another implementation, the UE receives the UAC barring information in a new field.

In another implementation, the UE sends the selected group ID to the RAN, so that the RAN determines an AMF based on the selected group ID and sends an initial message to a core network (CN).

In another implementation, the selected Group ID comprises an index to a list of group IDs.

In another implementation, the UE indicates the selected Group ID by a RRC signaling.

In another implementation, the RRC signaling comprises one of RRCSetupComplete or RRCResumeComplete.

In another implementation, the upper layer of UE received the selected or a registered network ID from the CN, the selected or the registered network ID undergone a registration procedure by the CN.

In another implementation, the upper layer of the UE indicates the select or the registered network ID to the lower layer of the UE; and the lower layer of the UE sends the cell access related information corresponding to the selected or the registered network ID to the upper layer of the UE.

In another implementation, the cell access related information comprising at least one of the following: a TAC corresponding to the selected or the registered network ID, or a cell ID corresponding to the selected or the registered network ID.

In another implementation, the upper layer of the UE indicates a supporting requirement for the specific network-access to the lower layer of the UE.

In another implementation, the upper layer of the UE sends a support indication for the specific network-access to the lower layer of the UE.

In another implementation, the lower layer of the UE only selects or reselects a cell supporting the specific network-access.

In another implementation, in response to the upper layer of the UE indicating the lower layer of the UE to select a network with the second indication, the UE only selects or reselects a cell with the second indication.

In another implementation, in response to the network with the second indication being selected by the upper layer of the UE, the lower layer of the UE only considers at least one cell with the selected network ID and the second indication as reselection candidates.

In another implementation, the UE sends the RAN an indication indicating at least one of the following: to support the specific network-access; or to support a group ID.

In another implementation, in response to the upper layer of the UE indicating the lower layer of the UE to select a network that support the specific network-access the UE indicates the specific network-access to the RAN.

In another implementation, in response to the upper layer of the UE indicating the lower layer of the UE to select a network with the second indication, the UE indicates the second indication information to the RAN.

In another implementation, in response to the upper layer of the UE indicating a group ID to the lower layer of the UE, the UE indicates to the RAN one of the specific network-access or an support group ID indication.

In another implementation, the UE sends the indication through a RRC signaling.

In another implementation, the RRC signaling comprises a Msg 5 comprising one of RRCSetupComplete or RRCResumeComplete.

In another implementation, the UE receives the at least one group ID, the first indication, the second indication per frequency from the RAN.

In another implementation, the frequency includes at least one of the following: an inter frequency, or an intra frequency.

In another implementation, the UE only considers the frequency that supports the at least one group ID, the first indication, or the second indication as a target frequency.

In another implementation, the UE receives from the RAN a physical cell identity (PCI) range of at least one cell that supports the first indication.

In another implementation, the PCI range is broadcasted per frequency comprising at least one of the following: an inter frequency, or an intra frequency.

In another implementation, the UE only considers the at least one cell within the PCI range that supports the at least one group ID, the first indication, or the second indication as a target cell.

Referring to FIG. 5, the present disclosure describes various embodiments of a method 500 for supporting, by a radio access network (RAN), a network access feature. The method 500 includes a portion or all of the following step: step 510: broadcasting, by the RAN, a broadcast message to a user equipment (UE), wherein the broadcast message comprises at least one of the following: a group identifier (ID), a first indication, or a second indication.

In one implementation, the group ID comprises at least one network ID comprising at least one of the following: a stand-along non-public network (SNPN) ID, or a public land mobile network (PLMN) ID; the first indication indicates that a specific network-access is supported; and the second indication indicates whether a SNPN allows an access attempt corresponding to the specific network-access from a UE that is not explicitly configured to select the SNPN. In another implementation, the broadcast message comprising a system information block (SIB), for one example, SIB1.

In various embodiments, the group ID includes at least one of the following: a group of home separate entities, a group of on-boarding networks, and/or a group of subscription owners.

In various embodiments, the specific network-access comprises access using credentials from a separate entity, for example, a separate subscription entity for the SNPN, or home subscription provider (HSP). In some embodiments, the specific network-access comprises on-boarding access. In one implementation, the broadcast message comprises at least one of the following per network ID: the at least one Group ID, the first indication, or the second indication.

In another implementation, the RAN adds at least one of the following for each network ID: the at least one group ID, the first indication, or the second indication in a legacy network ID field in the broadcast message.

In another implementation, the RAN adds a new network ID list in the broadcast message.

In another implementation, the new network ID list comprises an index of each network ID corresponding to a legacy network ID list.

In another implementation, for each index, the RAN broadcasts at least one of the following: the at least one group ID, the first indication, or the second indication.

In another implementation, in response to a SNPN only supporting one or more group ID as a separate entity, the first indication is not set.

In another implementation, the RAN selects an AMF based on a selected group ID indicated by the UE.

In another implementation, the broadcast message comprises at least one of the following: the at least one Group ID per cell, the first indication per network ID, or the second indication per network ID.

In another implementation, for each group ID, the broadcast message further comprises at least one of: a tracking area code (TAC), a cell ID, a RAN Area code (RAC), or a cell for other use indicator.

In another implementation, the RAN receives a selected group ID from the UE; and the RAN determines an AMF based on the selected group ID.

In another implementation, the selected group ID comprises an index to a list of group IDs.

In another implementation, the RAN receives the selected group ID by an RRC signaling.

In another implementation, the RRC signaling comprises one of RRCSetupComplete or RRCResumeComplete.

In another implementation, the RAN sends an initial message to a core network (CN), so that the CN performs an registration procedure on the selected network ID and sends the selected or a registered network ID to the UE.

In another implementation, the RAN broadcasts a set of UAC parameters for at least one of the following: the selected group ID only, or the UE accessing a home subscription provider (HSP).

In another implementation, the RAN receives from the UE an indication indicating at least one of the following: to support the specific network-access; or to support a group ID.

In another implementation, in response to receiving the indication to support the specific network-access from the UE, the RAN selects an AMF that supports the specific network-access.

In another implementation, in response to receiving the indication to support a group ID from the UE, the RAN selects an AMF that supports a group ID.

In another implementation, the RAN receives the indication from a RRC signaling.

In another implementation, the RRC signaling comprises a Msg 5 comprising one of RRCSetupComplete or RRCResumeComplete.

In another implementation, the RAN broadcasts the at least one group ID, the first indication, the second indication per frequency.

In another implementation, the frequency includes at least one of the following: an inter frequency, or an intra frequency.

In another implementation, the RAN broadcasts a physical cell identity (PCI) range of at least one cell that supports the first indication.

In another implementation, the PCI range is broadcasted per frequency comprising at least one of the following: an inter frequency, or an intra frequency.

In the present disclosure, a set of various embodiments for the specific network-access including access using credentials from a separate entity will be first described, which is followed by another set of various embodiments for the specific network-access including on-boarding access. These two sets of embodiments may share some similarities, at least some of which are described below.

Access Using Credentials From A Separate Entity

A separate subscription entity function may refer to the support for SNPN along with subscription or credentials owned by an entity being separate from the SNPN. For example but not limited to, a first UE (UE1) with home subscription provider (Home SP, or HSP) of SNPN1, if the SNPN1 achieves some agreements with SNPN2, the UE1 may get service from the SNPN2. This may be analogous to the roaming cases of the public network.

In another implementation, the HSP may also be a group ID. the SNPN2 may need to broadcast that it support the "separate subscription entity function". For example, a group ID as a specific case of SNPN ID may reuse SNPN ID with at least one of the following: assignment mode 1 indicates self-managed Home SP group ID values as the NID value is chosen independently at deployment time; assignment mode 0 indicates Home SP group ID is globally unique as the NID value is globally unique. One possibility for ensuring uniqueness is to use IANA PEN.

In another implementation, SIB may be enhanced as at least one of the following, for SNPN only: indication that "access using credentials from a separate entity is supported"; or optionally, supported group IDs (GIDs).

Optionally in another implementation, an indication whether the SNPN allows registration attempts from UEs that are not explicitly configured to select the SNPN.

In various embodiments in the present disclosure, a first indication may refer to an indication that access using credentials from a separate entity is supported, and/or a second indication may refer to an indication that indicates whether the SNPN allows registration attempts from UEs that are not explicitly configured to select the SNPN.

Figure 6:
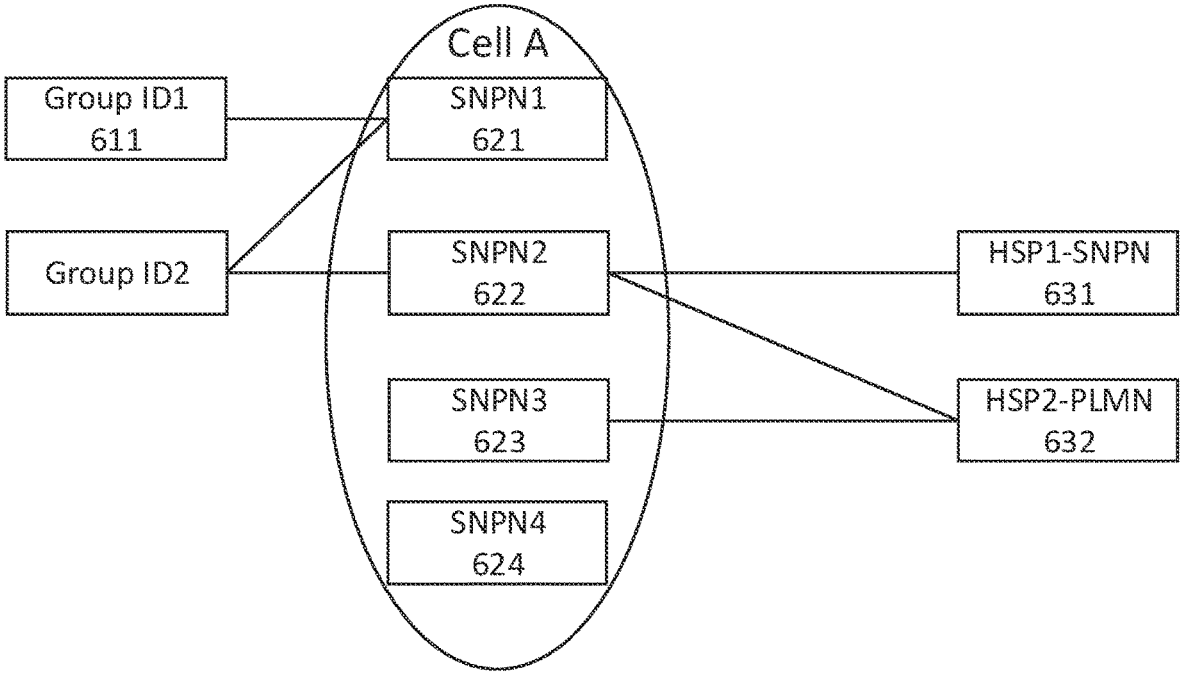
FIG. 6 shows a schematic diagram of a method for wireless communication.

There are some issues/problems with configuring a NPN. For example of a network scenario where one cell may be shared by multiple networks, one issue/problem may include how to broadcast the separate subscription entity information. Referring to FIG. 6, a SNPN can have agreement with multiple home subscription providers, meanwhile, a home subscription can connect to multiple SNPN networks. The home subscription provider can be SNPN, PLMN or a group ID. For example, the SNPN2 622 may have agreement with HSP1 631 and HSP2 632; and/or the HSP2 632 can connect to the SNPN2 622 and the SNPN3 623.

For the network sharing scenario, the first indication may be broadcasted per SNPN. For example, for the SNPN1 621, it may support to use credentials from a separate entity, while for the SNPN4 624 it may not support this feature. For another example, the second indication may also be broadcasted per SNPN. Furthermore, for the case that a SNPN only supports one or more group ID as the separate entity, for example, a group ID1 611, the first indication may not be set. For the group ID, it may be broadcast per cell or per Network ID (e.g., per SNPN).

Thus, the present disclosure describes the following methods: a first method is that the network broadcasts one or more Group ID, the first indication, and/or the second indication per network ID; and a second method is that the network broadcasts the first indication, and/or the second indication per network ID, and broadcasts one or more Group ID per cell.

First Method

In one implementation, referring to Table 1, a broadcast message, for example, a system information block 1 (SIB1), is added with one or more Group ID, the first indication, and/or the second indication for each network ID to the legacy network ID field.

TABLE 1

| Group ID, first indication, or second indication are added for each network ID: |
|---|

```
SIB1 ::=    SEQUENCE {
    cellAccessRelatedInfo                    CellAccessRelatedInfo}
CellAccessRelatedInfo::=                     SEQUENCE {
    npn-IdentityInfoList                     NPN-IdentityInfoList-r16   }
NPN-IdentityInfoList-r16 ::=                     SEQUENCE (SIZE (1..maxNPN-r16)) OF NPN-
IdentityInfo-r16
NPN-IdentityInfo-r16 ::=                      SEQUENCE {
        npn-IdentityList-r16                     SEQUENCE (SIZE (1..maxNPN-r16)) OF
NPN-Identity-r16,
        trackingAreaCode-r16                     TrackingAreaCode,
        ranac-r16                                RAN-AreaCode              OPTIONAL,
-- Need R
        cellIdentity-r16                         CellIdentity,
        cellReservedForOperatorUse-r16           ENUMERATED {reserved, notReserved},
        iab-Support-r16                          ENUMERATED {true}      OPTIONAL,
-- Need S
    ...,
    [[group-IdentityList-r17                 SEQUENCE (SIZE (1..maxGroup-r17)) OF snpn-r16
OPTIONAL, -- Need R]]
    [[supportSeperateEntity                  ENUMERATED {true}          OPTIONAL,   -- Need
R  ]]
    [[seprateEntitySecondInd                 ENUMERATED {true}          OPTIONAL,   -- Need
R  ]]
}
``` supportSeperateEntity: Indicate that 'access using credentials from a separate entity is supported'"

SeprateEntitySecondInd: Indicate whether the SNPN allows registration attempts from UEs that are not explicitly configured to select the SNPN"

group-IdentityList-r17: Indicate one or more Group ID that supported by the correspond SNN In another implementation, referring to Table 2, a broadcast message, for example, a system information block 1 (SIB1), is added with a new network ID list to indicate one or more Group ID, the first indication, and/or the second indication for each network ID.

In various embodiments, the UE may receive a broadcast from the network that broadcasts one or more Group ID, the first indication, and/or the second indication per network ID. In one implementation, the first indication indicates that access using credentials from a separate entity is supported.

TABLE 2 network ID list, first indication, or second indication are added for each network ID:

```
SIB1 ::=                      SEQUENCE {
  cellAccessRelatedInfo                    CellAccessRelatedInfo}
CellAccessRelatedInfo::=                 SEQUENCE {
  npn-IdentityInfoList                   NPN-IdentityInfoList-r16              OPTIONAL,
  enpn-IdentityInfoList                NPN-IdentityInfoList-r17              OPTIONAL  }
NPN-IdentityInfoList-r16 ::=                 SEQUENCE (SIZE (1..maxNPN-r16)) OF NPN-
IdentityInfo-r16
NPN-IdentityInfo-r16 ::=                 SEQUENCE {
  npn-IdentityList-r16                    SEQUENCE (SIZE (1..maxNPN-r16)) OF NPN-
Identity-r16,
  trackingAreaCode-r16                  TrackingAreaCode,
  ranac-r16                             RAN-AreaCode
OPTIONAL,            -- Need R
  cellIdentity-r16                       CellIdentity,
  cellReservedForOperatorUse-r16             ENUMERATED {reserved, notReserved},
  iab-Support-r16                       ENUMERATED {true}           OPTIONAL,
-- Need S
...
}
NPN-IdentityInfoList-r17   ::=                 SEQUENCE (SIZE (1..maxNPN-r16)) OF NPN-
IdentityInfo-r17
NPN-IdentityInfo-r17   ::=                 SEQUENCE {
npnIndex                              INTEGER (1..maxNPN-r16)
group-IdentityList                    SEQUENCE (SIZE (1..maxValue)) OF snpn-r16
supportSeperateEntity                 ENUMERATED {true}           OPTIONAL,
seprateEntitySecondInd                ENUMERATED {true}           OPTIONAL }
``` npnIndex
Index of the SNPN/PLMN across the plmn-IdentityList and npn-IdentityInfoList fields included in SIB1.
supportSeperateEntity: Indicate that 'access using credentials from a separate entity is supported'"
SeprateEntitySecondInd: Indicate whether the SNPN allows registration attempts from UEs that are not explicitly configured to select the SNPN"
group-IdentityList-r17: Indicate one or more Group ID that supported by the corresponding SNPN/PLMN For various embodiments, the UE may adopt one or more unified access control (UAC) parameter of the corresponding network ID (e.g., SNPN ID) when the UE selects a group ID. In one implementation, however, the UE may need to indicate the selected group ID to the RAN, and the RAN may further select an access and mobility management function (AMF) based on the group ID.

In another implementation, as a selected Group ID indication, when the one or more group ID is indicated per network ID (e.g., SNPN or PLMN), the UE may add a new element in the message (e.g., Msg5) to indicate the selected Group ID. Referring to Table 3, the message may be a RRCSetupComplete message.

TABLE 3

RRCSetupComplete message:

```
RRCSetupComplete ::=          SEQUENCE {
  rrc-TransactionIdentifier            RRC-TransactionIdentifier,
  criticalExtensions                 CHOICE {
    rrcSetupComplete                    RRCSetupComplete-IEs,
    criticalExtensionsFuture             SEQUENCE { }
  }}
RRCSetupComplete-IEs ::=      SEQUENCE {
  selectedPLMN-Identity                  INTEGER (1..maxPLMN),
  selectedGroup-Identity               INTEGER (1..maxValue) optional
...
}
selectedGroup-Identity
Index of the Group ID selected by the UE from the group-IdentityList of
the corresponding network ID (e.g., SNPN/PLMN)
```

In another implementation, the second indication indicates whether the SNPN allows registration attempts from UEs that are not explicitly configured to select the SNPN". In another implementation, the network ID may be a SNPN ID, and/or a PLMN ID.

In another implementation, the UE can receive one or more Group ID, the first indication, the second indication for each network ID that is included in the legacy network ID field.

In another implementation, the UE can receive a new network ID list. In another implementation, the new network ID list includes the index of each network ID corresponding to the legacy network ID list. In another implementation, for each index, the UE can read one or more Group ID, the first indication, the second indication.

In another implementation, for the selected network ID, if the first indication was included or set to TRUE, the UE shall take it as "access using credentials from a separate entity is supported", the UE lower layer (AS layer) may report first indication to the upper layer (NAS layer).

In another implementation, when the second indication is included or set to TRUE, the UE may take it as "the SNPN allows registration attempts from UEs that are not explicitly configured to select the SNPN", the UE lower layer (AS layer) may report the second indication to the upper layer (NAS layer).

In another implementation, the upper layer (NAS layer) may indicate the group ID to the lower layer (AS layer), the lower layer may check whether there is a matched group ID, if have the UE report the corresponding cell access info (e.g., SNPN ID/Cell ID/TAC) to the upper layer.

In another implementation, for the separate entity, the UE NAS layer may indicate information as below:

Case 1: The VSNPN included the "user-controlled list" or the "separate entity-controlled list" together with the first indication (access using credentials from a separate entity is supported) if the UE can't find any Registered SNPN or the SNPN that UE has the corresponding SUPI.

Case 2: Indicate group ID(s), if the UE can't find any available SNPN in the "user-controlled list" or the "separate entity-controlled list".

Case 3: The second indication (whether the SNPN allows registration attempts from UEs that are not explicitly configured to select the SNPN), if the UE can't find any available Group ID.

For the case 1, the UE AS layer may select the cell that broadcasts the indicated VSNPN(s) and the first indication as the suitable cell until a new indication is received from the UE NAS layer.

For the case 2, the UE AS layer may select the cell that broadcasts the Group ID as the suitable cell until a new indication is received from the UE NAS layer. Considering that the Group ID has the same format as the SNPN ID, the UE NAS may indicate the AS layer that it's a Group ID by some method.

When a group ID is supported by more than one SNPNs, e.g., in the FIG. 6, the Group ID 2 being supported by both the SNPN1 and SNPN2, the UE may select either SNPN1/SNPN2, and this decision may be made by either the AS layer or the NAS layer. If this decision is made by the AS layer, e.g., SNPN1 being selected, the NAS layer may need to indicate the forbidden SNPN(s) to the AS once the SNPN1 is rejected by the network, thus it's better to report all of the SNPNs and the related cell info of this Group ID to the UE NAS layer and let the NAS layer make the final decision.

For the case that a group ID is supported by more than one SNPNs, the UE AS may report all of the SNPNs and the related cell info of this Group ID to the NAS layer and let the NAS layer make the final decision.

For the case 3, the UE AS layer may select the cell that broadcasts the second indication as the suitable cell temporally, once the UE registers successfully, the UE AS may indicate a registered SNPN to the UE AS, then the UE may take the cell with the registered SNPN as the suitable cell.

In another implementation, the UE determine the UAC for the selected group ID based om the corresponding network ID (e.g., SNPN ID).

In another implementation, the UE may indicate the selected Group ID info to the RAN, and the RAN may further select the AMF based on the group ID. In another implementation, the selected Group ID may be an Index according to the group ID list of the corresponding SNPN ID. In another implementation, the UE may indicate the selected Group ID by an RRC signal, e.g., RRCSetupComplete, or RRCResumeComplete message.

In various embodiments, the network broadcasts one or more Group ID, the first indication, and/or the second indication per network ID to the UE. In one implementation, the first indication indicates that access using credentials from a separate entity is supported. In another implementation, the second indication indicates whether the SNPN allows registration attempts from UEs that are not explicitly configured to select the SNPN".

In another implementation, the network ID can be SNPN ID, or PLMN ID. In another implementation, the method may be implemented by adding one or more Group ID, the first indication, and/or the second indication for each network ID to the legacy network ID field.

In another implementation, the method may be implemented by adding a new network ID list. In another implementation, in the new network ID list, it includes the index of each network ID corresponding to the legacy network ID list. In another implementation, for each index, the network may broadcasts one or more Group ID, the first indication, and/or the second indication.

In another implementation, for the case that a SNPN only support one or more group ID as the separate entity, the first indication shall not be set. In another implementation, the RAN may further select the AMF based on the group ID.

Second Method

In one implementation, referring to Table 4, a broadcast message, for example, a system information block 1 (SIB1), is added with one or more Group ID per cell, and/or the first indication and/or the second indication for each network ID. Another implementation is shown in Table 5.

TABLE 4

| Group ID per cell: |
| --- |

```
SIB1 ::=       SEQUENCE {
   cellAccessRelatedInfo              CellAccessRelatedInfo}
CellAccessRelatedInfo::=            SEQUENCE {
   npn-IdentityInfoList             NPN-IdentityInfoList-r16
group-IdentityList                 SEQUENCE (SIZE (1..maxValue))
                                   OF snpn-r16 }
group-IdentityList-r17: Indicate one or more Group ID that supported by
this cell
```

TABLE 5

| Group ID per cell: |
| --- |

```
SIB1 ::=       SEQUENCE {
   cellAccessRelatedInfo              CellAccessRelatedInfo}
CellAccessRelatedInfo::=            SEQUENCE {
   npn-IdentityInfoList             NPN-IdentityInfoList-r16
group-IdentityList         SEQUENCE (SIZE (1..maxValue)) OF
Group-Identity }
Group-Identity::=       SEQUENCE {
       npn-IdentityList-r16                SEQUENCE (SIZE
                                           (1..maxNPN-r16)) OF NPN-
Identity-r16,
trackingAreaCode-r16                TrackingAreaCode,
    ranac-r16                       RAN-AreaCode        OPTIONAL,
-- Need R
       cellIdentity-r16                CellIdentity,
       cellReservedForOperatorUse-r16 ENUMERATED
       {reserved, notReserved},
}
group-IdentityList-r17: Indicate one or more Group ID that supported by
this cell
```

In another implementation, a method may solve one or more remaining issue, for example but not limited to, how the UE determines the UAC parameters, and/or how the UE indicates the selected network to the RAN node for the AMF selection. The solution to the remaining issue may depend on how many network ID (including the network ID in the legacy PLMN-IdentityInfoList and NPN-IdentityInfoList) and the group ID can be broadcasted.

In another implementation, a total number of PLMNs (identified by a PLMN identity in plmn-IdentityList), PNI-NPNs (identified by a PLMN identity and a CAG-ID), and SNPNs (identified by a PLMN identity and a NID) together in the PLMN-IdentityInfoList and NPN-IdentityInfoList does not exceed 12, except for the NPN-only cells. In case of NPN-only cells the PLMN-IdentityList contains a single element that does not count to the limit of 12.

The present disclosure describes two options to solve the issue/problem. Option A: the total number of the network IDs and the Group IDs does not exceed the legacy maximum value (e.g., 12). Option B: a number of the network IDs and the number of the Group IDs are calculated separately, e.g., the number of the network IDs does not exceed 12, and the number of the Group IDs does not exceed a value e.g., 23. For the option A, the legacy UAC parameters structure and the legacy selected selectedPLMN-Identity indicating the selected network ID in the message 5 (RRCSetupComplete and/or RRCResumeComplete) may be reused to also indicate the UAC parameters for the group ID.

In another implementation, referring to Table 6, a broadcast message, for example, a system information block 1 (SIB1), is added with UAC barring per group ID to reuse the legacy structure.

TABLE 6

UAC barring per Group ID:

```
SIB1 ::=        SEQUENCE {
uac-BarringInfo              SEQUENCE {
    uac-BarringForCommon          UAC-BarringPerCatList
OPTIONAL, -- Need S
    uac-BarringPerPLMN-List       UAC-BarringPerPLMN-List
OPTIONAL, -- Need S
    uac-BarringInfoSetList        UAC-BarringInfoSetList,
    uac-AccessCategory1-SelectionAssistanceInfo CHOICE {
        plmnCommon                UAC-AccessCategory1-
SelectionAssistanceInfo,
        individualPLMNList        SEQUENCE (SIZE
(2..maxPLMN)) OF UAC-AccessCategory1-SelectionAssistanceInfo
        }   OPTIONAL -- Need S
    }       OPTIONAL, -- Need R
UAC-BarringPerPLMN-List ::=     SEQUENCE (SIZE (1..
maxPLMN)) OF UAC-BarringPerPLMN
UAC-BarringPerPLMN ::=          SEQUENCE {
    plmn-IdentityIndex              INTEGER (1..maxPLMN),
    uac-ACBarringListType           CHOICE{
    uac-ImplicitACBarringList       SEQUENCE
(SIZE(maxAccessCat-1)) OF UAC-BarringInfoSetIndex,
    uac-ExplicitACBarringList       UAC-BarringPerCatList }
OPTIONAL    -- Need S}
plmn-IdentityIndex
Index of the PLMN or SNPN across the plmn-IdentityList and npn-
IdentityInfoList and group-IdentityList fields included in SIB1.
uac-BarringForCommon
Common access control parameters for each access category. Common
values are used for all PLMNs or the Group IDs, unless overwritten by
the
PLMN specific configuration provided in uac-BarringPerPLMN-List. The
parameters are specified by providing an index to the set of configurations
(uac-BarringInfoSetList).
```

In another implementation, for the option B, a new UAC parameters list and a new selectedGroupID was needed.

In another implementation, referring to Table 7, a broadcast message, for example, a system information block 1 (SIB1), is added with new UAC barringInfo for the Group ID.

TABLE 7

UAC barring per Group ID:

```
SIB1 ::=        SEQUENCE {
uac-BarringInfo              SEQUENCE {
    uac-BarringForCommon          UAC-BarringPerCatList
OPTIONAL, -- Need S
    uac-BarringPerPLMN-List       UAC-BarringPerPLMN-List
```

TABLE 7-continued

UAC barring per Group ID:

```
OPTIONAL, -- Need S
    uac-BarringInfoSetList        UAC-BarringInfoSetList,
    uac-AccessCategory1-SelectionAssistanceInfo CHOICE {
        plmnCommon                UAC-AccessCategory1-
SelectionAssistanceInfo,
        individualPLMNList        SEQUENCE (SIZE (2..maxPLMN))
OF UAC-AccessCategory1-SelectionAssistanceInfo
        }   OPTIONAL -- Need S
    }       OPTIONAL, -- Need R
    uac-BarringInfo-r17             SEQUENCE {
        uac-BarringForCommon          UAC-BarringPerCatList
OPTIONAL, -- Need S
        uac-BarringPerGroupId-List    UAC-BarringPerPLMN-List
OPTIONAL, -- Need S
        uac-BarringInfoSetList        UAC-BarringInfoSetList,
        uac-AccessCategory1-SelectionAssistanceInfo CHOICE {
            plmnCommon                UAC-AccessCategory1-
SelectionAssistanceInfo,
            individualPLMNList            SEQUENCE (SIZE
                                          (2..maxPLMN))
OF UAC-AccessCategory1-SelectionAssistanceInfo
            }   OPTIONAL -- Need S
    }       OPTIONAL, -- Need R
uac-BarringInfo-r17: UAC barring info for the group ID, which has the
similar structure to the legacy uac-BarringInfo, the difference is that
it was defined for the group IDs that broadcast by this cell, once a
group ID was selected by the upper layer, the UE adopt the UAC of the
corresponding group ID.
```

In another implementation, as a selected Group ID indication, when the one or more group ID is indicated per cell, the UE may add a new element in the message (e.g., Msg5) to indicate the selected Group ID. Referring to Table 8, the message may be a RRCSetupComplete message.

TABLE 8

RRCSetupComplete message:

```
RRCSetupComplete ::=            SEQUENCE {
    rrc-TransactionIdentifier        RRC-TransactionIdentifier,
    criticalExtensions               CHOICE {
        rrcSetupComplete                 RRCSetupComplete-IEs,
        criticalExtensionsFuture         SEQUENCE { }
    }}
RRCSetupComplete-IEs ::=        SEQUENCE {
    selectedPLMN-Identity            INTEGER (1..maxPLMN),
    selectedGroup-Identity           INTEGER (1..maxValue) optional
    ...
}
selectedGroup-Identity
Index of the Group ID selected by the UE from the group-IdentityList
```

In another implementation, once the RAN node receives the Msg 5 with the selectedGroup-Identity, the RAN node may determine the corresponding network ID (e.g., PLMN/SNPN) based on the selectedGroup-Identity.

Figure 7:
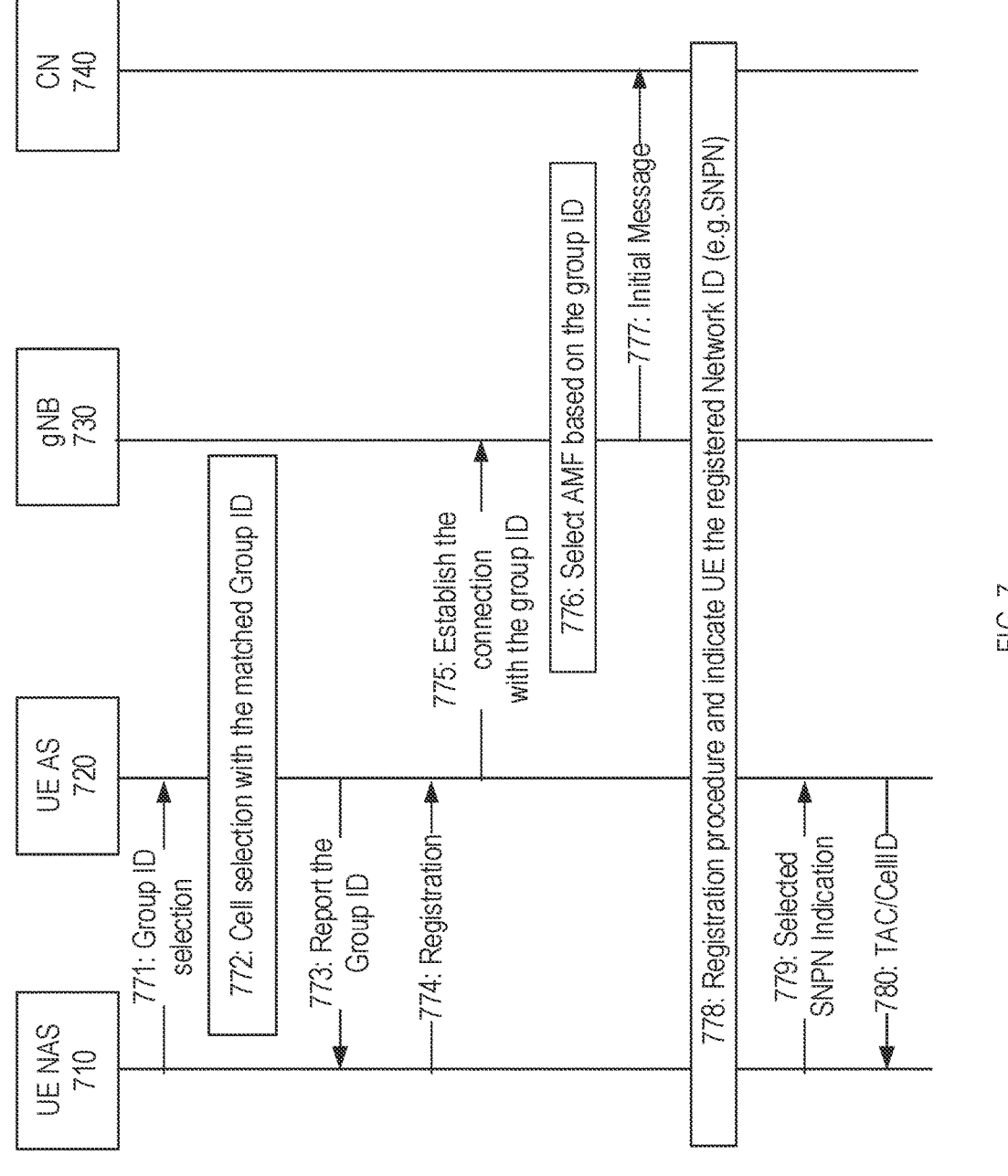
FIG. 7 shows a logic flow of a method for wireless communication.

In another implementation, referring to FIG. 7, an AMF selection may be based on the selectedGroup-Identity. FIG. 7 shows an exemplary logic flow of a method 700 to selecting an AMF based on a selected group identity, including a portion or all of the following: a UE NAS 710, a UE AS 720, a gNB 730, and/or a CN 740.

Referring to Steps 771-773, the UE upper layer (NAS layer) indicates the one or more group ID, the UE AS executes the group ID selection. Once UE reads the SIB1 that includes a matched group ID, for example, the group ID is included in the upper layer indicated Group ID(s), the UE reports the matched group ID to the Upper layer and stores the cell access info (e.g., Network ID and corresponding TAC/Cell ID information).

Referring to Steps 774-777, the UE triggers the upper layer procedure (e.g., registration procedure), the UE includes the selected group ID to the RAN node, the RAN node determines the AMF based on the group ID and sends initial message to the CN.

Referring to Steps 778-780, the CN finishes the upper layer procedure (e.g., registration procedure), and indicates the selected/registered network ID (e.g., SNPN ID) to the UE. The UE upper layer (NAS layer) indicates the selected/ registered network ID to the UE lower layer (AS layer), the UE AS layer sends the TAC/Cell ID and/or other cell access related information of the selected/registered network ID to the upper layer (NAS layer).

Figure 8:
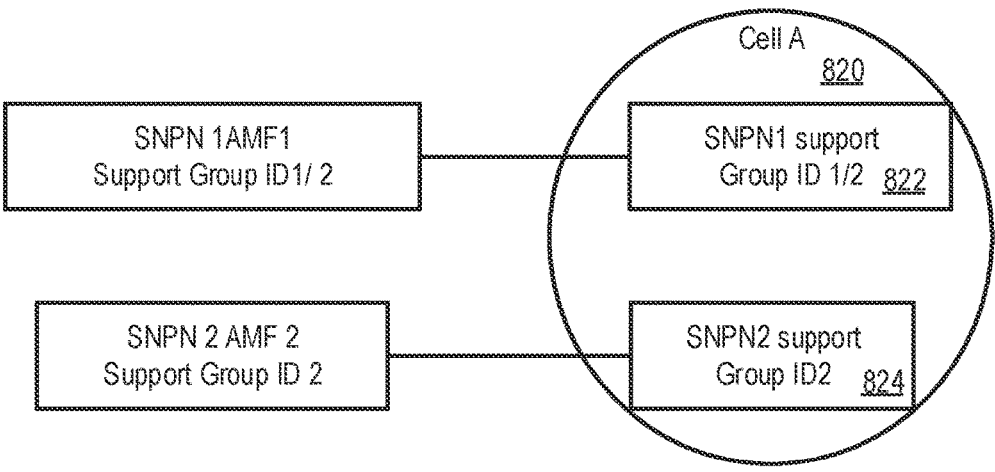
FIG. 8 shows a schematic diagram of a method for wireless communication.

For another example, referring to FIG. 8, a cell A 820 is shared by SNPN1 822 and SNPN2 824. The SNPN1 supports group ID 1 and 2; and the SNPN2 supports group ID 2. When the UE indicates group ID1 to the RAN node, the RAN node may select the AMF of the SNPN1 directly. When the UE indicate group ID 2 to the RAN node, the RAN node may select the AMF from one of AMF1 or AMF2.

The present disclosure describes various embodiments for the UE receiving one or more Group ID per cell from the network in the system Information. In one implementation, the UE upper layer (NAS layer) indicates the one or more group ID, the UE AS executes the group ID selection. In another implementation, once the UE reads the system Information that includes a matched group ID (the group ID is included in the upper layer indicated Group ID(s), the UE reports the matched group ID to the Upper layer, stores the cell access info (e.g., Network ID and corresponding TAC/ Cell ID information).

In another implementation, the UE receives the UAC barring info for the Group IDs from the system information, and determines the UAC parameters based on the selected Group ID from the upper layer (e.g., NAS layer). In another implementation, the UAC barring info for the Group IDs may be received in the legacy UAC parameters field, or add a new UAC barring Info for the Group ID.

In another implementation, the UE includes the selected group ID to the RAN node, the RAN node determines the AMF based on the group ID and sends initial message to the CN.

In another implementation, the selected Group ID may be an index according to the group ID list. In another implementation, the UE indicates the selected Group ID by an RRC signal, e.g., RRCSetupComplete, and/or RRCResume-Complete.

In another implementation, the UE upper layer (NAS layer) receives the selected/registered network ID from the CN. In another implementation, the UE upper layer (NAS layer) indicates the selected/registered network ID to the UE lower layer (AS layer), the UE AS layer sends the TAC/Cell ID and/or other cell access related information of the selected/registered network ID to the upper layer (NAS layer).

The present disclosure describes various embodiments for the network broadcasts one or more Group ID per cell in the system Information. In one implementation, the RAN node receives the selected group ID, and determines the AMF based on the group ID. In another implementation, the selected Group ID can be an index according to the group ID list. In another implementation, the RAN node receives the selected Group ID by an RRC signal, e.g., RRCSetupComplete, and/or RRCResumeComplete.

In another implementation, the CN sends the selected/ registered network ID to the UE In another implementation, for the UAC, the network may broadcast a set of UAC parameters for the group ID only or for the UE that access the Home SP.

Figure 9:
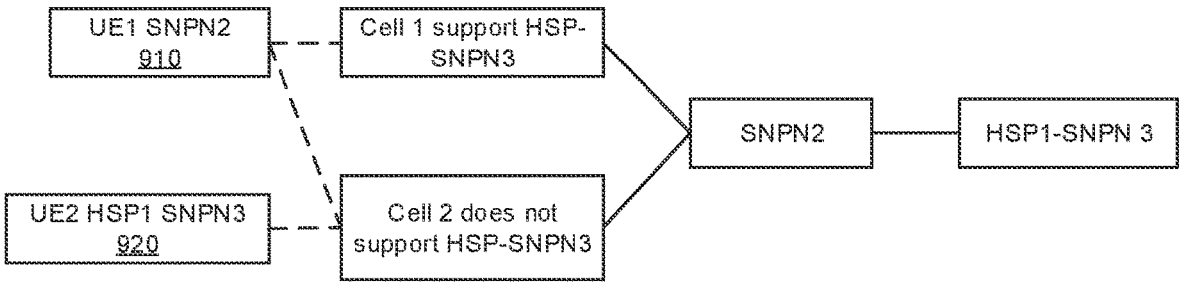
FIG. 9 shows a schematic diagram of a method for wireless communication.

Optional and/or Alternative Implementations for First Method and/or Second Method The present disclosure describes various embodiments that may impact on the interaction between NAS and AS. In one implementation, for the PLMN/SNPN selection, the NAS may indicate the selected PLMN/SNPN. For the eNPN, if the above embodiments or implementations is selected, the NAS may also indicate HSP supporting requirement to the AS. For example, referring to FIG. 9, both UE1 910 and UE 2 920 may indicate the SNPN2 to the AS, but obviously it's not enough for the UE2. For the UE2, the NAS may also indicate HSP supporting requirement to the AS, then the AS may only consider Cell 2.

In one implementation, the UE upper layer (NAS layer) indicates the HSP supporting requirement to the UE lower layer (AS layer), e.g., HSP support indication. In another implementation, the UE lower layer (AS layer) may only select or reselect to the cell that support HSP.

For another example, the NAS may indicate to find a cell with a second indication. The second indication may indicate whether the SNPN allows registration attempts from UEs that are not explicitly configured to select the SNPN. The UE AS may detect a cell with a SNPN broadcasting second indication and report the related SNPN to the NAS, then the NAS may trigger the registration procedure. During the registration procedure, the UE may consider the cells with the selected SNPN and the second indication as the reselection candidates until new command from NAS is received.

In one implementation, for the case that the UE upper layer (NAS layer) indicates the UE lower layer (AS layer) to select a Network with the second indication, the UE may only select or reselect a cell with the second indication, or optionally, the UE may only take the cells with the second indication as the suitable cell candidates. In another implementation, once a network with a second indication is selected by UE upper layer (NAS layer), the UE's lower layer (AS layer) may only consider the cells with the selected network ID and the second indication as the reselection candidates.

For another example, the UE may also indicate this requirement to the RAN node, and the RAN node selects the AMF that support "access using credentials from a separate entity" feature.

In one implementation, the UE indicates "access using credentials from a separate entity Indication'" or "support Group ID Indication" to the RAN node. In another implementation, when the UE upper layer (NAS layer) indicates the UE lower layer (AS layer) to select a Network that support "Access using credentials from a separate entity", the UE indicates "access using credentials from a separate entity'" to the RAN node. In another implementation, when the UE upper layer (NAS layer) indicates the UE lower layer (AS layer) to select a Network with the second indication, the UE indicates "access using credentials from a separate entity'" or the second indication information to the RAN node. In another implementation, when the UE upper layer (NAS layer) indicates the UE lower layer (AS layer) a group ID, the UE indicates "access using credentials from a separate entity'" or "support Group ID" to the RAN node. In another implementation, the UE send this indication through RRC signaling, e.g., Msg 5 (RRCSetupComplete or RRCResumeComplete).

In another implementation, referring to Table 9, an example of Asn.1 coding for a RRCSetupComplete message.

TABLE 9

| RRCSetupComplete message: |
| --- |

```
RRCSetupComplete ::=          SEQUENCE {
   rrc-TransactionIdentifier        RRC-TransactionIdentifier,
   criticalExtensions               CHOICE {
      rrcSetupComplete                 RRCSetupComplete-IEs,
      criticalExtensionsFuture         SEQUENCE { }
   }}
RRCSetupComplete-IEs ::=      SEQUENCE {
   selectedPLMN-Identity            INTEGER (1..maxPLMN),
separateentityInd                ENUM(TRUE) Optional,
supportGroupInd                  ENUM(TRUE) Optional,
...
}
separateentityInd: Indicate that the UE was from the separate entity, the
Ran node select the AMF that support "access using credentials from a
separate entity" feature
supportGroupInd: Indicate that the UE was from the Group ID, the Ran
node select the AMF that support Group ID
```

The present disclosure describes various embodiments for the RAN node receiving the "access using credentials from a separate entity indication" or "support Group ID indication" from the UE. In one implementation, the RAN node selects the AMF that supports "access using credentials from a separate entity" if receiving the "access using credentials from a separate entity indication" from the UE. In another implementation, the RAN node selects the AMF that supports "support Group ID indication" if receiving the "support Group ID indication" from the UE. In another implementation, the network receives this indication from the RRC signaling, e.g., Msg 5 (RRCSetupComplete or RRCResumeComplete).

The present disclosure describes various embodiments for providing enhancement to the system Information wherein the Network broadcasts one or more Group ID, the first indication, and/or the second indication per frequency. In one implementation, the frequency includes inter frequencies, and/or intra frequency. In another implementation, the Network may broadcast the PCI range of the cells that support first indication. In another implementation, the PCI range may be broadcast per frequency, including inter frequencies, and/or intra frequency.

The present disclosure describes various embodiments for providing enhancement to the system Information wherein the UE receives one or more Group ID, the first indication, and/or the second indication per frequency from the network. In one implementation, the frequency includes inter frequencies, and/or intra frequency. In another implementation, the UE only considers the frequency that support one or more Group ID, the first indication, or the second indication as the target frequency. In another implementation, the UE receives the PCI range of the cells that supports first indication. In another implementation, the PCI range may be received per frequency, including inter frequencies, and/or intra frequency. In another implementation, the UE only considers the cell within the PCI range that supports one or more Group ID, the first indication, or the second indication as the target cell.

On-Boarding Access

For some other examples, the UEs may have no subscriptions, and the UE may preconfigured with some default parameters. Based on the default parameters, the UE may find an on-boarding network (ON). Through the on-boarding network, the UE may download the subscriptions from a subscription owner (SO) network. Once the UE get the subscription, it may de-register from the on-boarding network and then register on the subscription owner network.

For the on-boarding parameter broadcasting and associated cell selection, the NG-RAN of the onboarding network includes an indication for Onboarding enabled in the SIB (per O-SNPN, considering that the NG-RAN can be shared) so that the UE may discover and select an appropriate O-SNPN. The UE may or may not be pre-configured with O-SNPN network selection information (e.g., O-SNPN network identifiers). In one implementation, upon registration to an SNPN for Onboarding, the UE provides an indication at RRC level that the RRC connection is for onboarding. This information may be specified only for SNPN and allows NG-RAN to select an appropriate AMF that supports onboarding procedures.

Figure 10:
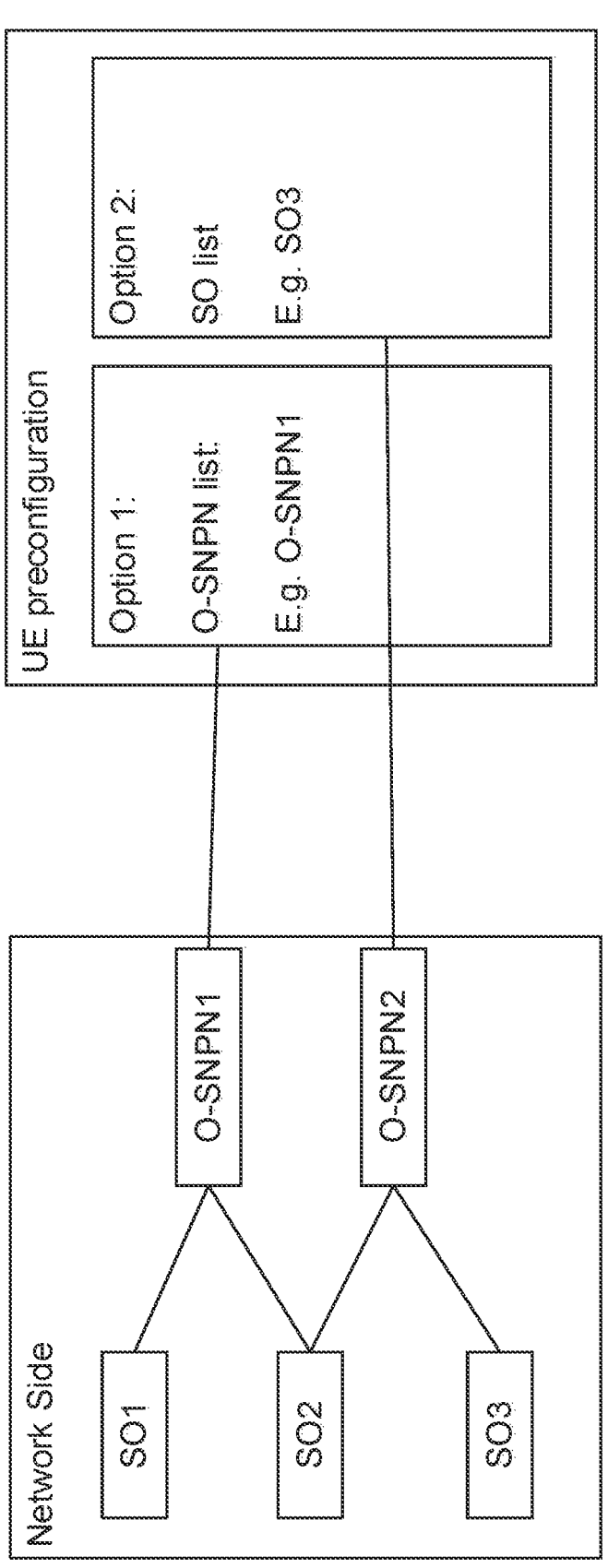
FIG. 10 shows a schematic diagram of a method for wireless communication.

FIG. 10 shows a structural diagram of SO and ON and UE pre-configurations. For the UE to find the on-boarding network, the NG-RAN of the Onboarding network includes information in the SIB so that the UE may discover and select an appropriate O-SNPN. In one implementation, there may be 2 solutions. Option 1: the UE is pre-configured the on-boarding SNPN list, then the UE can select the O-SNPN based on the configuration list. Option 2: the UE is pre-configured the subscription owner information, and the network broadcasts the subscription owner information.

In one implementation, for the option 2, the SO may be broadcasted per SNPN, and this may increase the signaling overhead significantly, and save some UE pre-configuration bits. In another implementation, for the option 1, from the network side, it may only need to broadcast an indication per SNPN, and introduce fewer signaling bits.

In another implementation, the network may broadcast the on-boarding support indication in the system Information.

For another example with taking the option 1 as a base line, the UE is pre-configured the on-boarding SNPN list, and the UE may select the O-SNPN based on the configuration list.

In another implementation, the O-SNPN may correspond to a temporary Network Identifier/Network readable name.

Figure 11:
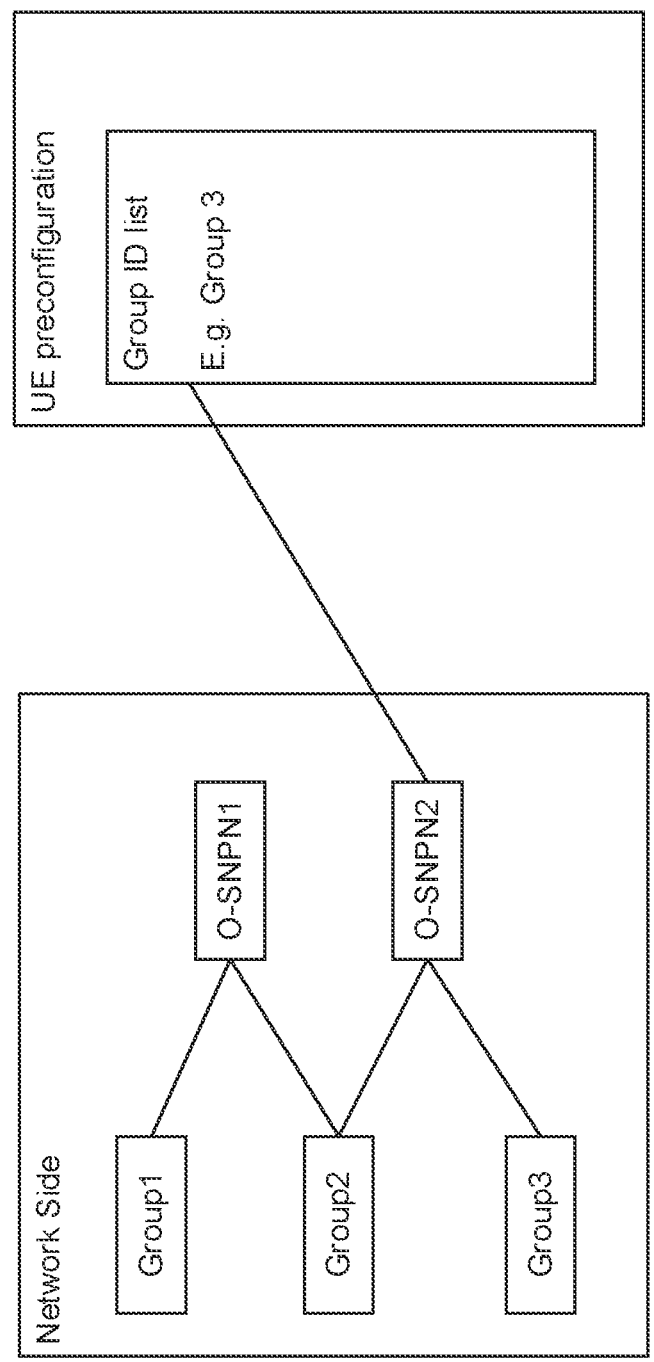
FIG. 11 shows a schematic diagram of a method for wireless communication.

In another implementation, for the cases that a O-SNPN has agreements with too many SO-SNPN, the SO-SNPNs can also be identified with a group ID as shown in the FIG. 11.

In another implementation, a group ID may be given to a group of O-SNPN.

In another implementation, as an enhancement to one or more of the above implementations, the group ID may be also broadcasted per network ID (e.g., SNPN) or per Cell. The network may broadcast both the O-SNPN group ID and SO-Group ID, but it may increase the system complexity and system information overhead. Without imposing any limitation to the various embodiments, the present disclosure describes embodiments considering to broadcast one of them.

In another implementation, for the temporary Network Identifier/Network readable name, it may be given by the SO, which may be different from the HRNN in the SIB10. In another implementation, it may be broadcast by a new SIB or by adding a new structure to the existing SIB that broadcast HRNN. In another implementation, the network may broadcast temporary Network Identifier/Network readable name by a new SIB or by adding a new structure to the existing SIB that broadcasts HRNN.

In another implementation, the UE may or may not be pre-configured with O-SNPN network selection information (e.g., O-SNPN network identifiers), which may mean that the UE may try to on-board the network with on-boarding support indication and are not care about the SNPN ID. In another implementation, a second indication may be added to indicate "allows on-boarding attempts from UEs that are not explicitly configured to select the SNPN".

In another implementation, for the system information, the network may broadcast information for the on-boarding network as below: the first indication that indicates on-boarding is supported; group ID (SO-SNPNs or O-SNPNs); the second indication that indicate whether "allows on-boarding attempts from UEs that are not explicitly configured to select the network (e.g., SNPN)"; temporary Network Identifier/Network readable name.

In another implementation, at the UE side, it may pre-configure with a SNPN list or a group ID or nothing. The UE may first try the SNPN list to do on-boarding, then group ID. When neither SNPN in the SNPN list nor the Group ID is found, the UE may try to find a cell that indicate "allows on-boarding attempts from UEs that are not explicitly configured to select the SNPN".

In another implementation, for the broadcast information, the first Indication/second indication/and/or the temporary elements may be discussed, including two indications and group IDs.

The present disclosure describes the following methods: a first method is that the network broadcasts one or more Group ID, the first indication, and/or the second indication per network ID; and a second method is that the network broadcasts the first indication, and/or the second indication per network ID, and broadcasts one or more Group ID per cell.

The two methods of broadcasting the above elements for on-boarding access may be similar or analogous to the two methods discussed above for access using credentials from a separate entity. One of the difference is that the two indications may have different meanings. Thus, the below disclosure of the two methods for on-boarding access may be referred to the above description for access using credentials from a separate entity.

First Method

In one implementation, referring to Table 10, a broadcast message, for example, a system information block 1 (SIB1), is added with one or more Group ID, the first indication, and/or the second indication for each network ID to the legacy network ID field.

TABLE 10

| Group ID, first indication, or second indication are added for each network ID: |
|---|

```
SIB1 ::=      SEQUENCE {
    cellAccessRelatedInfo                     CellAccessRelatedInfo}
CellAccessRelatedInfo::=              SEQUENCE {
    npn-IdentityInfoList          NPN-IdentityInfoList-r16   }
NPN-IdentityInfoList-r16 ::=              SEQUENCE (SIZE (1..maxNPN-r16)) OF NPN-
IdentityInfo-r16
NPN-IdentityInfo-r16 ::=              SEQUENCE {
    npn-IdentityList-r16                      SEQUENCE (SIZE (1..maxNPN-r16)) OF NPN-
Identity-r16,
    trackingAreaCode-r16                      TrackingAreaCode,
    ranac-r16                                 RAN-AreaCode          OPTIONAL,  --
Need R
    cellIdentity-r16                          CellIdentity,
    cellReservedForOperatorUse-r16            ENUMERATED {reserved, notReserved},
    iab-Support-r16                           ENUMERATED {true}     OPTIONAL,  --
Need S
    ...,
[[group-IdentityList-r17   SEQUENCE (SIZE (1..maxGroup-r17)) OF snpn-r16
OPTIONAL, -- Need R]]
[[supportOnboarding      ENUMERATED {true}     OPTIONAL, -- Need R   ]]
[[onboardingSecondInd     ENUMERATED {true}     OPTIONAL, -- Need R   ]]
}
supportOnboarding: Indicate that support on-boarding
onboardingSecondInd: Indicate whether the SNPN allows onboarding attempts from
UEs that are not explicitly configured to select the SNPN"
group-IdentityList-r17: Indicate one or more Group ID that supported by the
correspond network ID (e.g.SNPN ID)
```

Network Identifier or Network readable name may be broadcast per Network ID (e.g., SNPN), but for the Group ID, it may be per cell or per Network ID (e.g., SNPN). The temporary Network Identifier or Network readable name may not be broadcasted in another SIB, and the first 3

In another implementation, referring to Table 11, a broadcast message, for example, a system information block 1 (SIB1), is added with a new network ID list to indicate one or more Group ID, the first indication, and/or the second indication for each network ID.

TABLE 11

| network ID list, first indication, or second indication are added for each network ID: |
|---|

```
SIB1 ::=      SEQUENCE {
    cellAccessRelatedInfo                     CellAccessRelatedInfo}
CellAccessRelatedInfo::=         SEQUENCE {
    npn-IdentityInfoList          NPN-IdentityInfoList-r16         OPTIONAL,
    enpn-IdentityInfoList         NPN-IdentityInfoList-r17         OPTIONAL  }
```

TABLE 11-continued

| network ID list, first indication, or second indication are added for each network ID: |
| --- |

```
NPN-IdentityInfoList-r16 ::=    SEQUENCE (SIZE (1..maxNPN-r16)) OF NPN-
IdentityInfo-r16
NPN-IdentityInfo-r16 ::=       SEQUENCE {
    npn-IdentityList-r16                     SEQUENCE (SIZE (1..maxNPN-r16)) OF NPN-
Identity-r16,
        trackingAreaCode-r16                 TrackingAreaCode,
        ranac-r16                            RAN-AreaCode
OPTIONAL, -- Need R
        cellIdentity-r16                     CellIdentity,
        cellReservedForOperatorUse-r16       ENUMERATED {reserved, notReserved},
        iab-Support-r16                      ENUMERATED {true}       OPTIONAL,
-- Need S
...
}
NPN-IdentityInfoList-r17 ::= SEQUENCE (SIZE (1..maxNPN-r16)) OF NPN-
IdentityInfo-r17
NPN-IdentityInfo-r17 ::=           SEQUENCE {
npnIndex                          INTEGER (1..maxNPN-r16)
group-IdentityList                SEQUENCE (SIZE (1..maxValue)) OF snpn-r16
supportOnboarding       ENUMERATED {true}       OPTIONAL,
onboardingSecondInd     ENUMERATED {true}       OPTIONAL }
npnIndex
Index of the SNPN/PLMN across the plmn-IdentityList and npn-IdentityInfoList
fields included in SIB1.
supportOnboarding: Indicate that support on-boarding
onboardingSecondInd: Indicate whether the SNPN allows onboarding attempts from
UEs that are not explicitly configured to select the SNPN"
group-IdentityList-r17: Indicate one or more Group ID that supported by the
correspond network ID (e.g.SNPN ID)
```

In another implementation, as a selected Group ID indication, when the one or more group ID is indicated per network ID (e.g., SNPN), the UE may add a new element in the message (e.g., Msg5) to indicate the selected Group ID. Referring to Table 12, the message may be a RRCSetupComplete message.

TABLE 12

| RRCSetupComplete message: |
| --- |

```
RRCSetupComplete ::=            SEQUENCE {
    rrc-TransactionIdentifier       RRC-TransactionIdentifier,
    criticalExtensions              CHOICE {
        rrcSetupComplete                RRCSetupComplete-IEs,
        criticalExtensionsFuture        SEQUENCE { }
    }}
RRCSetupComplete-IEs ::=        SEQUENCE {
    selectedPLMN-Identity           INTEGER (1..maxPLMN),
    selectedGroup-Identity          INTEGER (1..maxValue) optional
...
}
selectedPLMN-Identity
Index of the PLMN or SNPN selected by the UE from the
plmn-IdentityList or npn-IdentityInfoList fields included in SIB1.
selectedGroup-Identity
Index of the Group ID selected by the UE from the group-IdentityList
of the corresponding network ID (e.g., SNPN/PLMN)
```

Second Method

In one implementation, referring to Table 13, a broadcast message, for example, a system information block 1 (SIB1), is added with one or more Group ID per cell, and/or the first indication and/or the second indication for each network ID.

TABLE 13

| Group ID per cell: |
| --- |

```
SIB1 ::=       SEQUENCE {
    cellAccessRelatedInfo                   CellAccessRelatedInfo}
CellAccessRelatedInfo::=                SEQUENCE {
```

TABLE 13-continued

| Group ID per cell: |
| --- |

```
    npn-IdentityInfoList                    NPN-IdentityInfoList-r16
group-IdentityList                      SEQUENCE (SIZE (1..maxValue))
                                        OF snpn-r16 }
group-IdentityList-r17: Indicate one or more Group ID that supported by
this cell
```

In another implementation, referring to Table 14, a broadcast message, for example, a system information block 1 (SIB1), is added with UAC barring per group ID to reuse the legacy structure.

TABLE 14

| UAC barring per Group ID: |
| --- |

```
SIB1 ::=       SEQUENCE {
    uac-BarringInfo                         SEQUENCE {
        uac-BarringForCommon                    UAC-BarringPerCatList
OPTIONAL, -- Need S
        uac-BarringPerPLMN-List                 UAC-BarringPerPLMN-List
OPTIONAL, -- Need S
        uac-BarringInfoSetList                  UAC-BarringInfoSetList,
        uac-AccessCategory1-SelectionAssistanceInfo CHOICE {
            plmn Common                             UAC-AccessCategory1-
SelectionAssistanceInfo,
            individualPLMNList                      SEQUENCE (SIZE
(2..maxPLMN)) OF UAC-AccessCategory1-SelectionAssistanceInfo
        } OPTIONAL -- Need S
    }       OPTIONAL, -- Need R
UAC-BarringPerPLMN-List ::=             SEQUENCE (SIZE
(1.. maxPLMN)) OF UAC-BarringPerPLMN
UAC-BarringPerPLMN ::=                  SEQUENCE {
    plmn-IdentityIndex                      INTEGER (1..maxPLMN),
    uac-ACBarringListType                   CHOICE{
        uac-ImplicitACBarringList               SEQUENCE
```

TABLE 14-continued

| UAC barring per Group ID: |
|---|
| (SIZE(maxAccessCat-1)) OF UAC-BarringInfoSetIndex, |
|     uac-ExplicitACBarringList                UAC-BarringPerCatList   } |
| OPTIONAL -- Need S} |
| plmn-IdentityIndex |
| Index of the PLMN or SNPN across the plmn-IdentityList and npn- |
| IdentityInfoList and group-IdentityList fields included in SIB1. |
| uac-BarringForCommon |
| Common access control parameters for each access category. Common |
| values are used for all PLMNs or the Group IDs, unless overwritten by |
| the PLMN specific configuration provided in uac-BarringPerPLMN-List. |
| The parameters are specified by providing an index to the set of |
| configurations (uac-BarringInfoSetList). UE behaviour upon absence |
| of this field may be specified |

In another implementation, for the option B, a new UAC parameters list and a new selectedGroupID was needed.

In another implementation, referring to Table 15, a broadcast message, for example, a system information block 1 (SIB1), is added with new UAC barringInfo for the Group ID.

TABLE 15

| UAC barring per Group ID: |
|---|
| SIB1 ::=        SEQUENCE { |
|   uac-BarringInfo                SEQUENCE { |
|     uac-BarringForCommon          UAC-BarringPerCatList |
| OPTIONAL, -- Need S |
|     uac-BarringPerPLMN-List        UAC-BarringPerPLMN-List |
| OPTIONAL, -- Need S |
|     uac-BarringInfoSetList          UAC-BarringInfoSetList, |
|     uac-AccessCategory1-SelectionAssistanceInfo CHOICE { |
|         plmnCommon              UAC-AccessCategory1- |
| SelectionAssistanceInfo, |
|         individualPLMNList           SEQUENCE (SIZE (2..maxPLMN)) |
| OF UAC-AccessCategory1-SelectionAssistanceInfo |
|     }        OPTIONAL -- Need S |
|   }        OPTIONAL, -- Need R |
|   uac-BarringInfo-r17           SEQUENCE { |
|     uac-BarringForCommon          UAC-BarringPerCatList |
| OPTIONAL, -- Need S |
|     uac-BarringPerGroupId-List      UAC-BarringPerPLMN-List OPTIONAL, |
| -- Need S |
|     uac-BarringInfoSetList          UAC-BarringInfoSetList, |
|     uac-AccessCategory1-SelectionAssistanceInfo CHOICE { |
|         plmnCommon              UAC-AccessCategory1- |
| SelectionAssistanceInfo, |
|         individualPLMNList       SEQUENCE (SIZE (2..maxPLMN)) |
| OF UAC-AccessCategory1-SelectionAssistanceInfo |
|     }        OPTIONAL -- Need S |
|   }        OPTIONAL, -- Need R |
| uac-BarringInfo-r17: UAC barring info for the group ID, which has the |
| similar structure to the legacy uac-BarringInfo, the difference is that |
| it was defined for the group IDs that broadcast by this cell, once a |
| group ID was selected by the upper layer, the UE adopt the UAC of the |
| corresponding group ID. |

In another implementation, the network may be able to control the on-boarding access. As one of implementation methods, a set of on-boarding specific UAC parameters may be configured per on-boarding network, which may be implemented by adding a new access category or a new access ID.

In another implementation, as a selected Group ID indication, when the one or more group ID is indicated per cell, the UE may add a new element in the message (e.g., Msg5) to indicate the selected Group ID. Referring to Table 16, the message may be a RRCSetupComplete message.

TABLE 16

| RRCSetupComplete message: |
|---|
| RRCSetupComplete ::=          SEQUENCE { |
|   rrc-TransactionIdentifier         RRC-TransactionIdentifier, |
|   criticalExtensions           CHOICE { |
|     rrcSetupComplete          RRCSetupComplete-IEs, |
|     criticalExtensionsFuture      SEQUENCE { } |
|   }} |
| RRCSetupComplete-IEs ::=     SEQUENCE { |
|   selectedPLMN-Identity         INTEGER (1..maxPLMN), |
|   selectedGroup-Identity         INTEGER (1..maxValue) optional |
|   ... |
|   } |
|   selectedGroup-Identity |
|   Index of the Group ID selected by the UE from the group-IdentityList |

In another implementation, referring to FIG. 7, an AMF selection may be based on the selectedGroup-Identity. FIG. 7 shows an exemplary logic flow of a method 700 to selecting an AMF based on a selected group identity.

In another implementation, referring to Table 17, an example of Asn.1 coding for a RRCSetupComplete message.

In another implementation, the UE may need to indicate an on-boarding indication either in Msg3 or the Msg 5. Considering that there may be only 5 spare values for the establish cause in the Msg3, it's better to include such indication in the Msg5 e.g., RRCResumeComplete or RRC-SetupComplete message. From the RAN side, for the on-boarding access attempt, it may make the procedure as simple as possible, e.g., avoid the handover/redirection just for the load balancing, avoid unnecessary measurement, and so on. Thus for the on-boarding indication, besides the function of AMF selection, it may also be used by the RAN node to simplify the AS procedures as much as possible.

TABLE 17

RRCSetupComplete message:

| RRCSetupComplete ::= | SEQUENCE { |
|---|---|
| rrc-TransactionIdentifier | RRC-TransactionIdentifier, |
| criticalExtensions | CHOICE { |
| rrcSetupComplete | RRCSetupComplete-IEs, |
| criticalExtensionsFuture | SEQUENCE { } |
| }} | |
| RRCSetupComplete-IEs ::= | SEQUENCE { |
| selectedPLMN-Identity | INTEGER (1..maxPLMN), |
| onboardingInd | ENUM(TRUE) Optional, |
| supportGroupInd | ENUM(TRUE) Optional, |
| ... | |
| } | | onboardingInd: Indicate that this establish is for on-boarding, the Ran node select the AMF that support on-boarding feature
supportGroupInd: Indicate that the UE was from the Group ID, the Ran node select the AMF that support Group ID Referring to FIG. 12, the present disclosure describes various embodiments of a method 1200 for supporting, by a user equipment (UE), an enhanced non-public network (eNPN). The method 1200 includes a portion or all of the following step: step 1210: receiving, by the UE, an indication in a RRC signaling from a radio access network (RAN), wherein the indication indicates whether to support at least one of the following for an non-public network: an internet protocol (IP) multimedia subsystem (IMS) voice, or an emergency call (eCall). In one implementation, the indication is indicated per network ID.

In another implementation, the indication is indicated per frequency comprising at least one of the following: an inter frequency, or an intra frequency.

In another implementation, the RRC signaling comprises at least one of the following: a system information, or a dedicated RRC signaling.

In another implementation, in response to the UE requiring an IMS or eCall service and a current cell not supporting the IMS or eCall service, the RAN sends the dedicated RRC signaling so as to redirect the UE to a target frequency or a cell that supports the IMS or eCall service.

In another implementation, in response to an upper layer of the UE indicating the IMS voice or the eCall, a lower layer of the UE only selects or reselects a cell supporting the IMS voice or the eCall.

Figures 12, 13:
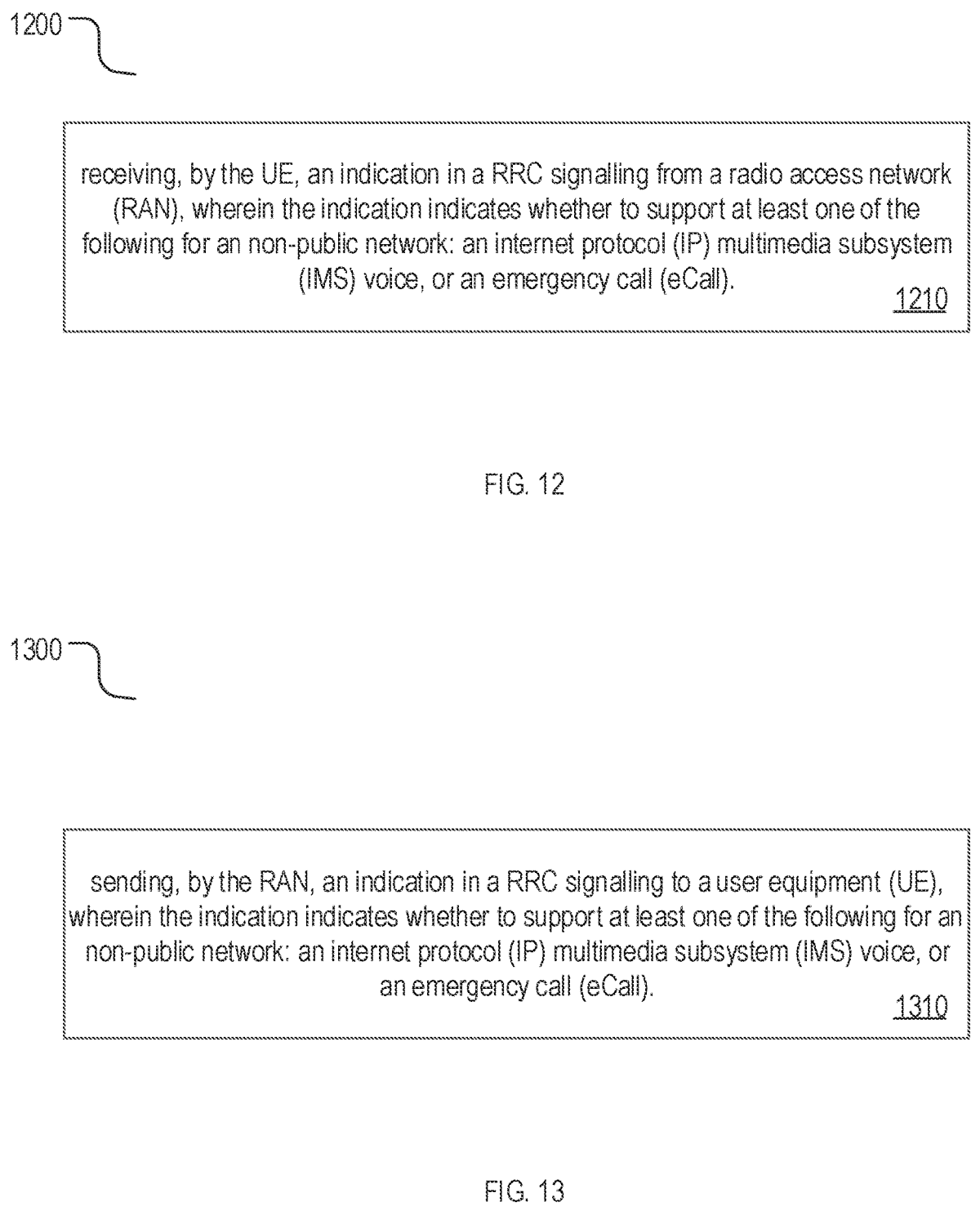

Referring to FIG. 13, the present disclosure describes various embodiments of a method 1300 for supporting, by a radio access network (RAN), an enhanced non-public network (eNPN). The method 1300 includes a portion or all of the following step: step 1310: sending, by the RAN, an indication in a RRC signaling to a user equipment (UE), wherein the indication indicates whether to support at least one of the following for an non-public network: an internet protocol (IP) multimedia subsystem (IMS) voice, or an emergency call (eCall). In one implementation, the indication is indicated per network ID.

In another implementation, the indication is indicated per frequency comprising at least one of the following: an inter frequency, or an intra frequency.

In another implementation, the RRC signaling comprises at least one of the following: a system information, or a dedicated RRC signaling.

In another implementation, in response to the UE requiring an IMS or eCall service and a current cell not supporting the IMS or eCall service, the RAN sends the dedicated RRC signaling so as to redirect the UE to a target frequency or a cell that supports the IMS or eCall service.

For one example, the use of IMC may be possible when USIM or ISIM is not available in UEs accessing IMS via an SNPN; the reuse of USIM credentials for IMS AKA may be possible when USIM is available in UEs accessing IMS via an SNPN; it may support voice services with SNPN based on existing mechanisms, and EPS fallback and T-ADS are not supported; it may support emergency services with SNPN; and/or it may support SNPN selection for "voice centric" UEs as the result of voice domain selection.

The present disclosure describes various embodiments to solve at least one of the issues on the emergency support with and without network sharing; and/or the IMS voice impact on the cell selection and reselection. For the emergency support, it may mainly affect the system information broadcasting. For the IMS voice supporting feature, it may affect the cell selection and reselection.

Emergency Supporting without Network Sharing

In one implementation, for the emergency supporting, there may have some impact on the system Information broadcasting. For the emergency supporting, without the network sharing, in the current system Information the following two parameters may be reused for the SNPN network:

| ims-EmergencySupport | ENUMERATED {true} | OPTIONAL, -- |
|---|---|---|
| Need R | | |
| eCallOverIMS-Support | ENUMERATED {true} | OPTIONAL, -- |
| Need R | | | wherein:
    eCallOverIMS-Support
        Indicates whether the cell supports eCall over IMS services as defined in TS 23.501 [32]. If absent, eCall over IMS is not supported by the network in the cell.
    ims-EmergencySupport
        Indicates whether the cell supports IMS emergency bearer services for UEs in limited service mode. If absent, IMS emergency call is not supported by the network in the cell for UEs in limited service mode.

In another implementation, once the UE receives these two bits in the SIB1, the UE may forward them to the NAS layer: forward the ims-EmergencySupport to upper layers, if present; or forward the eCallOverIMS-Support to upper layers, if present.

In another implementation, for the network sharing, it may need analyze how the legacy mechanism works first for the PLMN network sharing scenario, without network sharing, the legacy 2 elements may be adopted for the SNPN network to indicate whether supporting emergency.

IMS Supporting Impact on the Cell Selection and Re-Selection

In one implementation, for the public network, when the UE with usage setting to voice centric but the Network indicate it doesn't support IMS over NR PS in the registration accept message, the UE may disable NR mode for the related PLMN and try to another RAT such as LTE. The IMS voice supporting feature is per PLMN, and there is no indication in the system Information. The UE may determine the IMS voice supporting based on the NAS procedure.

In another implementation, for the SNPN, when the registered SNPN doesn't support IMS voice, the UE may try to resister with other SNPN. When there is multiple SNPNs with different capabilities of supporting IMS voice service, the network may broadcast the IMS support indication, and it may assist the Voice centric SNPN UE to register with the desired network.

In another implementation, in the public network, such indication may be also useful. Considering that the number of the subscribed PLMNs in the UE may be limited and in an area there are only few operators, this indication may not be as useful as the SNPN.

The present disclosure describes various embodiments for the network sending indication to indicate support IMS voice, eCall, or not for the non-public network in the RRC signaling. In one implementation, the Indication can be indicated per network ID. In another implementation, the indication may be per frequency including inter frequency or intra-frequency. In another implementation, the RRC signaling may be system Information or the dedicated RRC signal. In another implementation, for the case that the UE require IMS service, but the current cell doesn't support, the network may redirect the UE to the target frequency or cell that support IMS service by RRC signaling.

The present disclosure describes various embodiments for the UE receiving indication to indicate support IMS voice, eCall, or not for the non-public network in the RRC signaling. In one implementation, when the Upper layer indicate that IMS/eCall, the lower layer may only select/Reselect to the cell that support IMS/eCall.

The present disclosure describes methods, apparatus, and computer-readable medium for wireless communication. The present disclosure addressed the issues with configuring an enhanced non-public network (eNPN) for a new generation radio access network (NG-RAN). The methods, devices, and computer-readable medium described in the present disclosure may facilitate the performance of wireless transmission between a user equipment and multiple network nodes, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
supporting, by a user equipment (UE), a network access feature corresponding to access to a stand-alone non-public network (SNPN) by:

receiving, by the UE, a broadcast message from a radio access network (RAN), wherein the broadcast message comprises:
a group identifier (ID) comprising at least one network ID,
a first indication indicating that access to the SNPN using credentials from an entity from the SNPN is supported, and
a second indication indicating whether the SNPN allows an access attempt from a UE that is not explicitly configured to select the SNPN; and
sending, by the UE through radio resource control (RRC) signaling, a third indication indicating a selected network ID, wherein the RRC signaling comprises an RRCSetupComplete message.

2. The method according to claim 1, wherein:
the at least one network ID comprises at least one of the following:
a stand-along non-public network (SNPN) ID, or
a public land mobile network (PLMN) ID.

3. The method according to claim 1, wherein:
the broadcast message comprises: the at least one group ID per cell, the first indication per network ID, and the second indication per network ID.

4. The method according to claim 1, wherein:
the group ID comprises a group of network IDs of on-boarding networks.

5. The method according to claim 1, wherein:
the group ID comprises a group of network IDs of subscription owners.

6. A method for wireless communication, comprising:
supporting, by a radio access network (RAN), a network access feature corresponding to access to a stand-alone non-public network (SNPN) by:
broadcasting, by the RAN, a broadcast message to a user equipment (UE), wherein the broadcast message comprises:
a group identifier (ID) comprising at least one network ID,
a first indication indicating that access to the SNPN using credentials from an entity from the SNPN is supported, and
a second indication indicating whether the SNPN allows an access attempt from a UE that is not explicitly configured to select the SNPN; and
receiving, through radio resource control (RRC) signaling, a third indication indicating a selected network ID, wherein the RRC signaling comprises an RRCSetupComplete message.

7. The method according to claim 6, wherein:
the at least one network ID comprises at least one of the following:
a stand-along non-public network (SNPN) ID, or
a public land mobile network (PLMN) ID.

8. The method according to claim 6, wherein:
the broadcast message comprises: the at least one Group ID per cell, the first indication per network ID, and the second indication per network ID.

9. The method according to claim 6, wherein:
the group ID comprises a group of network IDs of on-boarding networks.

10. The method according to claim 6, wherein:
the group ID comprises a group of network IDs of subscription owners.

11. An apparatus comprising:

a memory storing instructions; and a processor in communication with the memory, wherein, when the processor executes the instructions, the processor is configured to cause the apparatus to perform:

supporting a network access feature corresponding to access to a stand-alone non-public network (SNPN) by:

receiving a broadcast message from a radio access network (RAN), wherein the broadcast message comprises:

a group identifier (ID) comprising at least one network ID, a first indication indicating that access to the SNPN using credentials from an entity from the SNPN is supported, and a second indication indicating whether the SNPN allows an access attempt from a UE that is not explicitly configured to select the SNPN; and sending, through radio resource control (RRC) signaling, a third indication indicating a selected network ID, wherein the RRC signaling comprises an RRCSetupComplete message.

12. The apparatus according to claim 11, wherein:

the at least one network ID comprises at least one of the following:

a stand-along non-public network (SNPN) ID, or a public land mobile network (PLMN) ID.

13. The apparatus according to claim 11, wherein:

the broadcast message comprises: the at least one group ID per cell, the first indication per network ID, and the second indication per network ID.

14. The apparatus according to claim 11, wherein:

the group ID comprises a group of network IDs of on-boarding networks.

15. The apparatus according to claim 11, wherein:

the group ID comprises a group of network IDs of subscription owners.

16. A non-transitory computer program product comprising a computer-readable program medium storing instructions, wherein, the instructions, when executed by a processor, are configured to cause the processor to perform:

supporting a network access feature corresponding to access to a stand-alone non-public network (SNPN) by:

receiving a broadcast message from a radio access network (RAN), wherein the broadcast message comprises:

a group identifier (ID) comprising at least one network ID, a first indication indicating that access to the SNPN using credentials from an entity from the SNPN is supported, and a second indication indicating whether the SNPN allows an access attempt from a UE that is not explicitly configured to select the SNPN; and sending, through radio resource control (RRC) signaling, a third indication indicating a selected network ID, wherein the RRC signaling comprises an RRCSetupComplete message.

17. The non-transitory computer program product according to claim 16, wherein:

the at least one network ID comprises at least one of the following:

a stand-along non-public network (SNPN) ID, or a public land mobile network (PLMN) ID.

18. The non-transitory computer program product according to claim 16, wherein:

the broadcast message comprises: the at least one group ID per cell, the first indication per network ID, and the second indication per network ID.

19. The non-transitory computer program product according to claim 16, wherein:

the group ID comprises a group of network IDs of on-boarding networks.

20. The non-transitory computer program product according to claim 16, wherein:

the group ID comprises a group of network IDs of subscription owners.

* * * * *